(12) United States Patent
Ortiz et al.

(10) Patent No.: US 11,681,552 B2
(45) Date of Patent: Jun. 20, 2023

(54) SYSTEM AND METHOD FOR DYNAMIC TIME-BASED USER INTERFACE

(71) Applicant: ROYAL BANK OF CANADA, Toronto (CA)

(72) Inventors: Edison U. Ortiz, Orlando, FL (US); Juan Martin Sacristan, Toronto (CA); Iustina-Miruna Vintila, Bucharest (RO); Arun John Milton, Toronto (CA); Adel Al Nabulsi, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 51 days.

(21) Appl. No.: 16/790,701

(22) Filed: Feb. 13, 2020

(65) Prior Publication Data
US 2020/0257561 A1  Aug. 13, 2020

Related U.S. Application Data

(60) Provisional application No. 62/804,820, filed on Feb. 13, 2019.

(51) Int. Cl.
*G06F 9/46* (2006.01)
*G06F 9/50* (2006.01)
(Continued)

(52) U.S. Cl.
CPC ............ *G06F 9/5011* (2013.01); *G06F 9/451* (2018.02); *G06F 11/328* (2013.01); *G06F 2209/5011* (2013.01); *G06F 2209/5019* (2013.01)

(58) Field of Classification Search
CPC ...... G06F 9/5011; G06F 9/451; G06F 11/328; G06F 2209/5011; G06F 2209/5019
See application file for complete search history.

(56) References Cited

U.S. PATENT DOCUMENTS

2017/0195994 A1* 7/2017 Cole ..................... H04W 76/10
2019/0130425 A1* 5/2019 Lei .......................... G06N 20/00
(Continued)

OTHER PUBLICATIONS

Chandra et al., Dynamic Resource Allocation for Shared Data Centers Using Online Measurements, University of Massachusetts Amherst, 2003, 22 pages.*
(Continued)

*Primary Examiner* — Diem K Cao
(74) *Attorney, Agent, or Firm* — Norton Rose Fulbright Canada LLP

(57) ABSTRACT

System and method for facilitating management of a time-varying resource pool. The system includes a processor and a memory coupled to the processor. The memory stores processor-executable instructions that, when executed, configure the processor to: obtain a time-series data set including data entries associated with one or more consumed resources; identify one or more recurring resource allocations based on recurring data entries of the time-series data set; identify additional resource allocations based on irregularly-timed data entries of the time-series data set; determine a forecasted resource pool value based on a combination of the identified recurring resource allocations and the additional resource allocations; and upon detection of a trigger condition, generate data for display, via a user interface, a scaled resource allocation value based on the forecasted resource pool value, the scaled resource allocation value corresponding to at least one time-based reference.

20 Claims, 10 Drawing Sheets

(51) Int. Cl.
*G06F 9/451* (2018.01)
*G06F 11/32* (2006.01)

(56) References Cited

U.S. PATENT DOCUMENTS

2019/0243686 A1* 8/2019 LaBute ................. G06F 9/5027
2019/0317826 A1* 10/2019 Jain ...................... G06F 9/5077

OTHER PUBLICATIONS

Abiodun et al., State-of-the-art in artificial neural network applications: A survey, Heliyon 4 (2018) e00938, Nov. 2018, 41 pages.*
FSB, Artificial Intelligence and machine learning in financial services, Financial Stability Board, Nov. 2017, 45 pages.*

* cited by examiner

SYSTEM AND METHOD FOR DYNAMIC TIME-BASED USER INTERFACE

CROSS REFERENCE TO RELATED APPLICATIONS

This application claims priority from U.S. provisional patent application No. 62/804,820, filed on Feb. 13, 2019, the entire contents of which are hereby incorporated by reference herein.

FIELD

Embodiments of the present disclosure generally relate to the field of data management, and in particular to systems and methods for generating dynamic time-based user interfaces.

BACKGROUND

Data records associated with resource allocations or resource transfers may originate from multiple data sources. One or more data records may be associated with overall resource pool values. As resource allocations or resource transfers are conducted, overall resource pool values associated with an entity may fluctuate over time. Resources may include computing resources, precious metals, digital tokens, currency, or other value.

SUMMARY

In one aspect, the present application provides a system for facilitating management of a time-varying resource pool. The system includes a processor and a memory coupled to the processor. The memory stores processor-executable instructions that, when executed, may configure the processor to: obtain a time-series data set including data entries associated with one or more consumed resources; identify one or more recurring resource allocations based on recurring data entries of the time-series data set; identify additional resource allocations based on irregularly-timed data entries of the time-series data set; determine a forecasted resource pool value based on a combination of the identified recurring resource allocations and the identified additional resource allocations; an upon detection of a trigger condition, generate data to display, via a user interface, a scaled resource allocation value based on the forecasted resource pool value, the scaled resource allocation value corresponding to at least one time-based reference.

In another aspect, the present application provides a method for facilitating management of a time-varying resource pool. The method may include: obtaining a time-series data set including data entries associated with one or more consumed resources; identifying one or more recurring resource allocations based on recurring data entries of the time-series data set; identifying additional resource allocations based on irregularly-timed data entries of the time-series data set; determining a forecasted resource pool value based on a combination of the identified recurring resource allocations and the additional resource allocations; and upon detection of a trigger condition, generating data to display, via a user interface, a scaled resource allocation value based on the forecasted resource pool value, the scaled resource allocation value corresponding to at least one time-based reference.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments in the present application are directed to resources pools, which may include resources such as computing resources, precious metals, digital tokens, securities (e.g., stocks, derivatives, or the like), currency, real estate, or any other resource that may be transferred from one entity to another entity. In some embodiments, data records may store data associated with resource allocations or transfers associated with one or more entities. In some embodiments, systems and methods described herein may conduct operations for facilitating management of a time-varying resource pool.

Systems described in the present application may be configured facilitate management of time-varying resource pools. For instance, time varying resource pools may be computing resources, such as memory resources, computational processing resources, or the like. Such memory resources or computational processing resources may be allocated on a recurring basis (e.g., scheduled computing tasks) or may be allocated on a non-recurring basis. As such, the computational processing resources may have a resource pool value that may vary over time.

In some examples of the present application, embodiment systems may be described as systems associated with banking institutions. The banking institution may provide banking accounts to users, and users may conduct resource allocations or resource transfers. Data records associated with resource allocations or transfers may originate from multiple data sources. Further, as resource allocations or transfers are conducted, overall resource pools associated with an entity may fluctuate over time. As numerous resource transfers may be conducted via computing networks, it may be challenging to track data records originating from multiple source devices. As the number of resource transfers increase, it may be challenging to identify an overall resource pool status, such as sufficiency of resources being available for recurring or non-recurring future transactions or for ensuring that the overall resource pool may include sufficient resources to supply any sharp changes in resource demands. Further, as the data sets may be associated with time-series records of resource allocations or resource transfers, it may be challenging to identify overall resource pool status having temporal dimensions.

Systems and methods for facilitating management of an overall resource pool are desirable. Further, systems and methods of dynamically providing user interfaces for identifying overall resource pool statistics are desirable.

Figure 1:
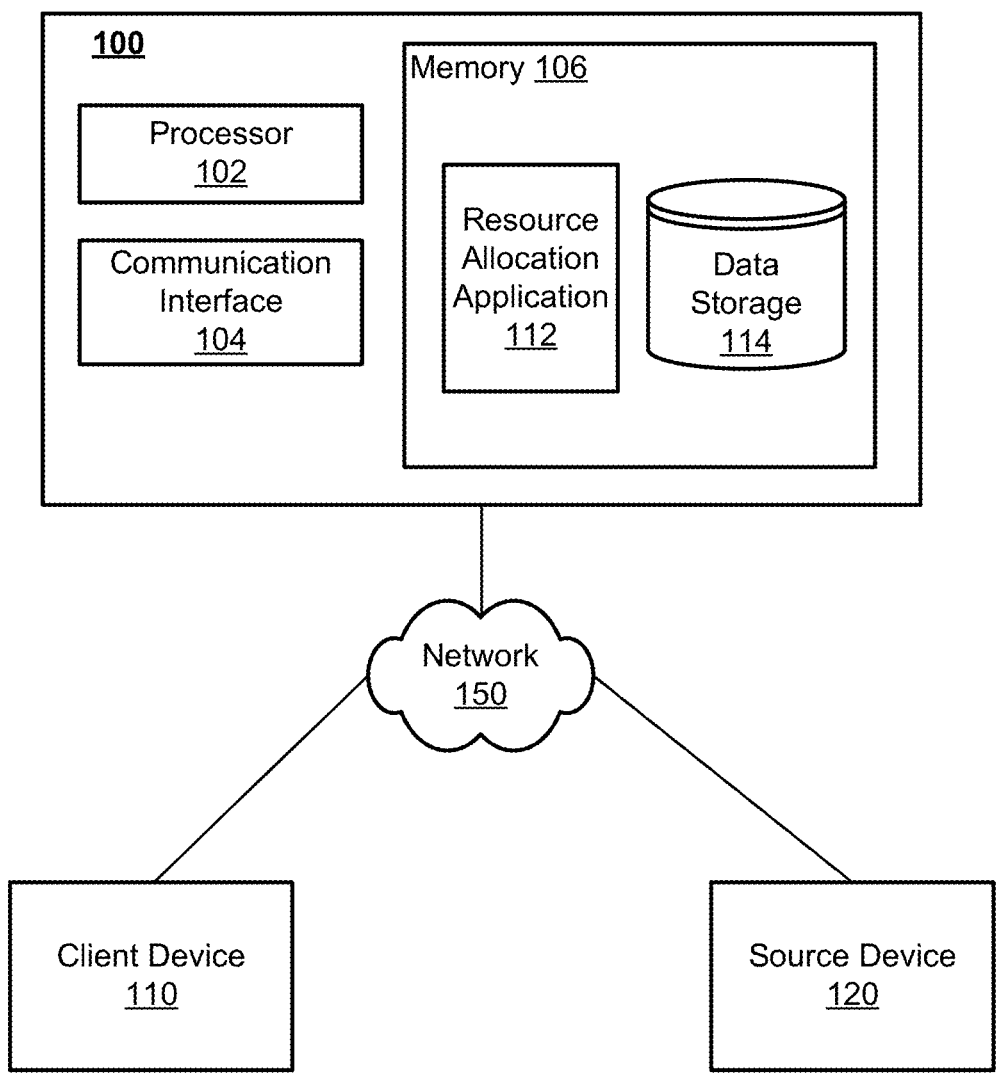
FIG. 1 illustrates a system for facilitating management of time-varying resource pools, in accordance with an embodiment of the present application.

Reference is made to FIG. 1, which illustrates a system 100 for facilitating management of a time-varying resource pool, in accordance with an embodiment of the present application. In some embodiments, the system 100 may transmit and/or receive data messages to/from a client device 110 via a network 150. In some embodiments, the system 100 may transmit and/or receive data messages to/from a source device 120. The network 150 may include a wired or wireless wide area network (WAN), local area network (LAN), a combination thereof, or the like.

The system 100 includes a processor 102 configured to implement processor readable instructions that, when executed, configure the processor 102 to conduct operations described herein. For example, the system 100 may be configured to conduct operations for facilitating management of a time-varying resource pool. In another example, the system 100 may be configured to generate user interfaces, such as graphical user interfaces, for dynamically displaying updated resource allocation pool metrics upon detecting fluctuations in the resource pool. Other example operations are contemplated.

The system 100 includes a communication interface 104 to communicate with other computing devices, to access or connect to network resources, or to perform other computing applications by connecting to a network (or multiple networks) capable of carrying data. In some embodiments, the network 150 may include the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combination of these. In some examples, the communication interface 104 may include one or more busses, interconnects, wires, circuits, and/or any other connection and/or control circuit, or combination thereof. The communication interface 104 may provide an interface for communicating data between components of a single device or circuit.

The system 100 may include memory 106. The memory 106 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

In some embodiments, the memory 106 may store a resource allocation application 112 including processor readable instructions for conducting operations described herein.

The system 100 may include a data storage 114. In some embodiments, the data storage 114 may be a secure data store. In some embodiments, the data storage 114 may store time-series data, such as resource allocation data, transaction data, or the like. The data storage 114 may store data received from one or more data sources, such as the source device 120.

The client device 110 may be a computing device including a processor, memory, and a communication interface. In some embodiments, the client device 110 may be a computing device associated with a local area network. The client device 110 may be connected to the network 150 and may transmit one or more data messages or data sets to the system 100.

Continuing with the example of the system 100 being associated with a banking institution, in some embodiments, the client device 110 may be associated with a banking institution client or user. The client device 110 may be configured to provide a graphical user interface, via a display, such that the user may access data associated with details of a banking account, an investment account, or the like associated with resource pools (e.g., currency, precious metals, or other assets) of the user.

In some embodiments, the client device 110 may be configured to transmit messages to the system 100 for requesting data associated resource pool metrics, such as bank account balance, past transaction details, or other details associated with allocation or transactions of resources. In some embodiments, the client device 110 may configure a display to provide a graphical user interface for displaying the data associated with resource allocation. Other operations may be contemplated. Although one client device 110 is illustrated in FIG. 1, any number of client devices may be configured to transmit messages to or receive messages from the system 100.

The source device 120 may be a computing device including a processor, memory, and a communication interface. In some embodiments, the source device 120 may be a computing device associated with a local area network.

The source device 120 may be connected to the network 150 and may transmit one or more data messages or data sets to the system 100. In some embodiments, the source device 120 may be associated with the banking institution and may provide data sets associated with resource pools of the banking institution user.

In some embodiments, the source device 120 may be associated with an entity other than the banking institution, and may provide ancillary data sets, such as data from credit card companies, data from cloud-based calendars, or other data sources that may provide context for forecasting future resource allocations, for identifying past resource allocations or transactions, or the like. In some embodiments, the source device 120 may be a computing device configured to aggregate data sets associated with banking institution users from multiple data sources. The aggregated data sets may include data entries associated with electronic mail accounts, travel reward accounts, social media accounts, calendar accounts, or the like for providing contextual information associated with users and user resource pools.

Figure 2:
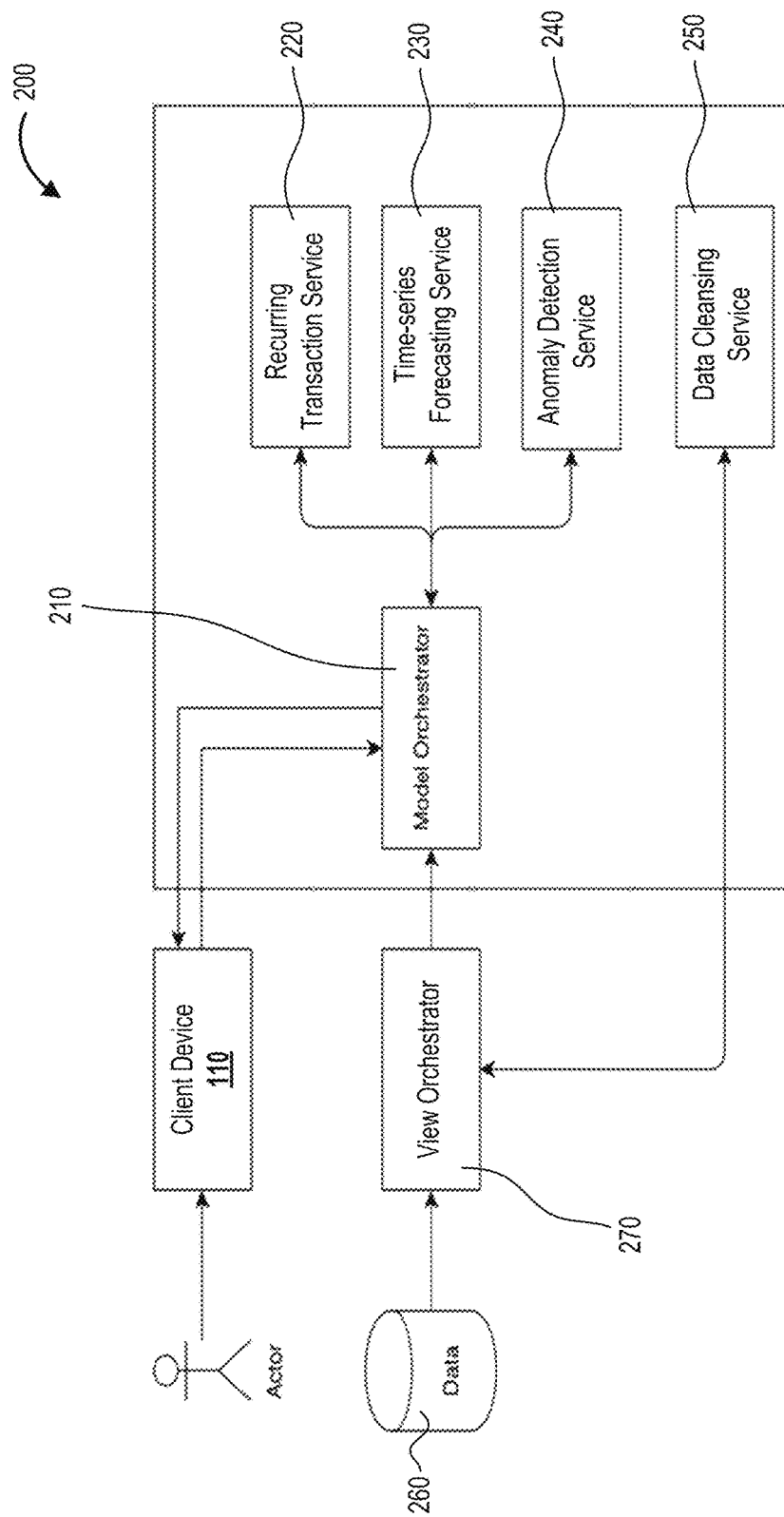
FIG. 2 illustrates a block diagram illustrating features of a resource allocation system, in accordance with embodiments of the present application.

Reference is made to FIG. 2, which illustrates a block diagram 200 illustrating features of a resource allocation system, in accordance with an embodiment of the present application. As an illustrative example, the block diagram 200 may illustrate features of the resource allocation application 112 (FIG. 1).

The resource allocation application 112 may be configured to conduct operations of a model orchestrator 210. The model orchestrator 210 may be configured as an interface to other features of the resource allocation application 112. For example, the model orchestrator 210 may be configured as an interface to send and/or receive data messages to/from the client device 110 (FIG. 1). The client device 110 may be associated with or may be operated by a user for interacting with the resource allocation application 112.

In some embodiments, the model orchestrator 210 may be configured to transmit data to or receive data from one or more data sources 260. In some embodiments, the one or more data sources 260 may be the source device 120 of FIG. 1. In some embodiments, the model orchestrator 210 transmits data to or receives data from the one or more data sources 260 via a view orchestrator 270. In some examples, the view orchestrator 270 may be configured to conduct operations for organizing, re-formatting, or transforming one data sets for receipt by the model orchestrator 210.

In some embodiments, the model orchestrator 210 may be configured to receive user account information or may be configured to obtain time-series data sets including data entries associated with one or more prior resource allocations or prior resource transactions. In some embodiments, the model orchestrator 210 may include operations for discarding data entries associated with resource allocations that do not satisfy date/time stamp criteria (e.g., delete transaction data occurring after a "cutoff date". In some embodiments, the model orchestrator 210 may include operations for discarding data entries associated with resource allocations associated with inactive user accounts or for obtaining data entries associated with resource allocations associated with active user accounts. In some embodiments, the model orchestrator 210 may include operations for obtaining data entries associated with resource allocations based on transaction categories, transaction vendor entity names, or other parameters received from the client device 110.

In some embodiments, the model orchestrator 210 may be configured with parameters that may configure operations of the recurring transaction service 220, the time-series forecasting service 230, and/or the anomaly detection service 240 described herein. In some embodiments, the model orchestrator 210 may receive setup parameters from the client device 110. For example, the received parameters may be associated with recurring transaction rules (e.g., minimum dollar amount on last observed recurring transaction, per frequency rules on dates or resource value ranges, whitelists associated with category IDs/subtypes or merchant names, or global parameters associated with account types.

In some embodiments, the model orchestrator 210 may be configured to receive data requests associated with determining recurring resource transactions, requests associated with forecasting future resource allocations, or requests to generate time-based user interfaces. To illustrate an embodiment of the model orchestrator 210, Table 1 (below) outlines definitions of an example data structure that may be associated with an input request for operations of the model orchestrator 210.

TABLE 1

Example data structure definitions

| Element | Data Type | Description | Mandatory | Example |
| --- | --- | --- | --- | --- |
| appId | String | Application key for configurations and data source in the Orchestrator | Yes | "wallet" |
| userId | String | Unique id of the user. For users, it is the client card number | Yes | "4519033065457324" |
| predictionTypes | Array | This element specifies the types of predictions to be performed for the user. notes \calling for balance will trigger recurring and non recurring calls. \balance cannot be called with categoriesOverride | Yes | ["RECURRING", "NON_RECURRING", "BALANCE", "ANOMALIES", "NEW_MERCHANT"] |

TABLE 1-continued

Example data structure definitions

| Element | Data Type | Description | Mandatory | Example |
|---|---|---|---|---|
| | | \only anomalies from 60 days prior to the cutoffDate will be returned | | |
| cutoffDate | Date | Predict From date. Default: Today's system date | No | 2019-03-15 |
| predictCutoff | Date | Predict To Date. Default: Last day of the month of (cutoffDate + 1 month) | No | 2019-04-30 |
| filters | Array[Filter] | This list of filters to apply to the transaction list | No | Sample Request<br>[<br>  {<br>    "name": "CATEGORY",<br>    "value": "string"<br>  },{<br>    "name": "MERCHANT_NAME",<br>    "value": "string"<br>  },{<br>    "name": "SUBTYPE",<br>    "value": "string"<br>  },{<br>    "name": "CATEGORY_TYPE",<br>    "value": "string"<br>  }<br>] |
| skipCache | Boolean | If true, skip the redis cache for fetching accounts and transactions Default: false | No | false |
| requesterInfo | RequesterInfo | Used for internal auditing | Yes | Sample Request<br>{<br>  "lang": "string",<br>  "app": "string",<br>  "version": "string",<br>  "mobileDeviceInfo": {<br>    "deviceModel": "string",<br>    "deviceOSVersion": "string",<br>    "devicePlatform": "string"<br>  }<br>} |

Table 2 illustrates an input request associated with operations of the model orchestrator 210 and an example output associated with operations of the model orchestrator 210.

TABLE 2

A representative portion of example input and output associated with operations of the model orchestrator 210

| Sample Request | Sample Response |
|---|---|
| {<br>  "appId": "string",<br>  "cutoffDate": "2017-06-03",<br>  "predictCutoff": "2017-07-03",<br>  "predictionTypes": [ | {<br>  "accountId": 33032328,<br>  "accountType": "CHECKING",<br>  "container": null,<br>  "currencyType": "CAD", |

TABLE 2-continued

A representative portion of example input and output associated
with operations of the model orchestrator 210

| Sample Request | Sample Response |
|---|---|
| "RECURRING",<br>"NON_RECURRING",<br>"BALANCE"<br>],<br>"requesterInfo": {<br>    "lang": "string",<br>    "app": "string",<br>    "version": "string",<br>    "mobileDeviceInfo": {<br>        "deviceModel": "string",<br>        "deviceOSVersion": "string",<br>        "devicePlatform": "string"<br>    }<br>},<br>"skipCache": false,<br>"userId": "4519033065457324"<br>} | "recurringPredictions": [<br>    {<br>        "amount": 10,<br>        "baseType": "DEBIT",<br>        "category": 2,<br>        "categoryType": "EXPENSE",<br>        "date": "2017-06-26",<br>        "description": "Auto Loan",<br>        "subType": "AUTO_LOAN"<br>    },<br>    {<br>        "amount": 108.57,<br>        "baseType": "DEBIT",<br>        "category": 6,<br>        "categoryType": "EXPENSE",<br>        "date": "2017-06-26",<br>        "description": "Union Gas Limited",<br>        "merchantName": "Union Gas Limited",<br>        "subType": "UTILITIES_PAYMENT"<br>    },<br>    ...<br>"nonRecurringPredictions": [<br>    {<br>        "baseType": "CREDIT",<br>        "categoryType": "INCOME",<br>        "predictions": [<br>            {<br>                "ds": "2017-06-03",<br>                "y": 1792<br>            },<br>            {<br>            }<br>        ]<br>    },<br>    ...<br>"balancePredictions": [<br>    {<br>        "ds": "2017-06-03",<br>        "y": 608<br>    },<br>    {<br>        "ds": "2017-06-10",<br>        "y": 2809<br>    },<br>    ...<br>],<br>"anomalies": [<br>    {<br>        "amount": 4300,<br>        "baseType": "DEBIT",<br>        "category": 11,<br>        "currrencyType": "CAD",<br>        "date": "2017-04-10",<br>        "description": "Transfer",<br>        "subType": "TRANSFER"<br>    }<br>],<br>... |

Table 3 (below) outlines definitions of the sample response depicted above.

TABLE 3

Example data definitions

| Attribute Name | | Description |
| --- | --- | --- |
| accountId | | The account from which the transaction was made. This is basically the primary key of the account resource. |
| accountType | | The type of account that is aggregated, i.e., checking, credit card. The account type is derived based on the attributes of the account. |
| container | | The account's container. Either bank or creditCard |
| currencyType | | Account Currency on which all amounts will be based on |
| recurringPredictions | amount | The forecasted amount of the transaction |
| | baseType | Indicates if the transaction appears as a debit or a credit transaction in the account. |
| | category | Category ID reference |
| | categoryType | The categoryType of the category assigned to the transaction. EXPENSE, INCOME |
| | currrencyType | Transaction original currency |
| | date | Transaction forecasted date |
| | description | The transaction description that appears at the FI site may not be self-explanatory, i.e., the source, purpose of the transaction may not be evident. Yodlee attempts to simplify and make the transaction meaningful to the consumer, and this simplified transaction description is provided in the simple description field. |
| | frequency | recurrance frequency (weekly, biweekly, or monthly) |
| | merchantName | The name of the merchant associated with the transaction. |
| | subType | The transaction subtype field provides a detailed transaction type. For example, purchase is a transaction type and the transaction subtype field indicates if the purchase was made using a debit or credit card. |
| nonRecurringPredictions | baseType | Indicates if the transaction appears as a debit or a credit transaction in the account. |
| | categoryType | The categoryType of the category assigned to the transaction. EXPENSE, INCOME |
| | ds | Forecasted Date |
| | y | Forecasted amount |
| balancePredictions | ds | Forecasted date |
| | y | Forecasted balance amount. For credit card, this is the available balance remaining |
| | alert | Indicates whether the checking account balance or creditCard account balance available amounts below or equal to pre-set configuration threshold |

In some embodiments, the model orchestrator 210 may be configured as an interface to a recurring transaction service 220. In the present example, the recurring transaction service 220 may be code-named "Lazarus".

The recurring transaction service 220 may include processor-executable instructions that, when executed by a processor, configure the processor to: (1) identify recurring transactions or resource allocations based on data sets representing past transactions; or (2) forecast recurring transactions that may be conducted at a future point-in-time.

In some embodiments, the recurring transaction service 220 may receive, from the model orchestrator 210, pre-processed data sets. In some examples, pre-processed data sets may include data sets having incomplete data entries removed from the set, where the data entries have been categorized or grouped according to common characteristics, or the like. In some embodiments, the view orchestrator 270 may be configured to pre-process data sets received from the one or more data sources 260.

In some embodiments, the recurring transaction service 220 may be configured to conduct rules based operations to identify recurring transactions based on a pre-defined set of rules, including data and amount ranges. Example recurring transactions may include resource allocations that occur on a periodic basis (e.g., paying a monthly subscription service fee). In another example, recurring resource allocations may include recurring transfers (e.g., pre-authorized payment) of money to a service provider (e.g., telephone service provider, video-streaming service provider) as a monthly subscription or service fee. In some embodiments, a processor may identify recurring transactions based on pre-processed data sets of user transaction and bank account data entries.

In some situations, periodic or recurring resource allocations may not occur on exact time intervals. For example, a resource allocation system may be configured to conduct operations to allocate resources on a normal operating business day (e.g., Monday to Friday). In situations where periodic resource allocations may be configured for a particular day (e.g., $1^{st}$ day of a month) and the particular day may not be on a normal operating business day, the resource allocation may occur on a next day that is a normal operating business day. Accordingly, in some embodiments, the recurring transaction service 220 may include operations based on parameters that account for variances in frequency metrics, such as weekly, bi-weekly, monthly, yearly, etc.

For example, the recurring transaction service 220 may include operations having parameters denoting a date deviation in days from a last observed transaction ("fuzzyDays"), a number of qualifying recurrences ("recurringInstances"), or amount deviation as a percentage value ("txAmountwggleRoom). Other parameters associated with rules-based operations for determining identifying recurring transactions in past time periods may be contemplated.

The following tables provide example pseudocode illustrating operations of the recurring transaction service 220, in accordance with embodiments of the present application. Table 4 illustrates example pseudocode for identifying monthly recurring transactions or resource allocations.

TABLE 4

Identifying Monthly Recurring Transactions or Resource Allocations

| Weekly Recurring | Weekly Recurring (gap or outlier) |
|---|---|
| JOIN past 7 day transactions (forecast from date − 7 days (inclusive)) WITH transactions found in the past n recurringInstance weeks. This per observed transaction date and +− a 'fuzzy' day ranges per week ON accountId, currencyType, baseType, (merchantName (if provided) else description), category, subType, AND amount within 'wiggle' range If n recurringInstance transactions match, label Recurring Weekly, and exclude from dataset note if multiple transactions matched, choose closest in date else first transaction with the least amount variance | JOIN past 7 day transactions (forecast from date − 7 days (inclusive)) WITH transactions found in the past n recurringInstance weeks. This per observed transaction date and +− a 'fuzzy' day ranges per week ON accountId, currencyType, baseType, (merchantName (if provided) else description), category, subType, If n − 1 recurringInstance transactions match in addition on amount within 'wiggle' range, label Recurring Weekly, and exclude all list transactions from dataset note if multiple transactions matched, choose closest in date else first transaction with the least amount variance |

In another example, Table 5 illustrates pseudocode for identifying bi-weekly recurring transactions or resource allocations.

TABLE 5

Identifying Bi-Weekly Recurring Transactions or Resource Allocations

| Bi-Weekly Recurring | Bi-Weekly Recurring (gap or outlier) |
|---|---|
| JOIN past 14 day transactions (forecast from date − 14 days (inclusive)) WITH transactions found in the past n recurringInstance bi-weeks. This per observed transaction date and +− a 'fuzzy' day ranges per bi-week ON accountId, currencyType, baseType, (merchantName (if provided) else description), category, subType, AND amount within 'wiggle' range If n recurringInstance transactions match, label Recurring Bi-Weekly, and exclude from dataset note if multiple transactions matched, choose closest in date else first transaction with the least amount variance | JOIN past 14 day transactions (forecast from date − 14 days (inclusive)) WITH transactions found in the past n recurringInstance bi-weeks. This per observed transaction date and +− a 'fuzzy' day ranges per bi-week ON accountId, currencyType, baseType, (merchantName (if provided) else description), category, subType If n − 1 recurringInstance transactions match in addition on amount within 'wiggle' range, label Recurring Bi-Weekly, and exclude all list transactions from dataset note if multiple transactions matched, choose closest in date else first transaction with the least amount variance |

In another example, Table 6 illustrates pseudocode for identifying monthly recurring transactions or resource allocations.

TABLE 6

Identifying Monthly Recurring Transactions or Resource Allocations

| Monthly Recurring | Monthly Recurring (gap or outlier) |
|---|---|
| JOIN past 1 month transactions (forecast from date − 1 month (inclusive)) WITH transactions found in the past n recurringInstance months. This per observed transaction date and +− a 'fuzzy' day ranges per month ON accountId, currencyType, baseType, (merchantName (if provided) else description), category, subType, AND amount within 'wiggle' range If n recurringInstance transactions match, label Recurring Monthly, and exclude from | JOIN past 1 month transactions (forecast from date − 1 month (inclusive)) WITH transactions found in the past n recurringInstance months. This per observed transaction date and +− a 'fuzzy' day ranges per month ON accountId, currencyType, baseType, (merchantName (if provided) else description), category, subType If n − 1 recurringInstance transactions match in addition on amount within 'wiggle' range, label Recurring Monthly, and exclude all list transactions from dataset |

TABLE 6-continued

Identifying Monthly Recurring Transactions or Resource Allocations

| Monthly Recurring | Monthly Recurring (gap or outlier) |
|---|---|
| dataset<br>note if multiple transactions matched, choose closest in date else first transaction with the least amount variance | note if multiple transactions matched, choose closest in date else first transaction with the least amount variance |

In some embodiments, the recurring transaction service 220 may be configured to forecast recurring transactions up to a future point-in-time. For example, the recurring transaction service 220 may be configured to predict recurring resource allocations that may occur a week from today, a month from today, etc., based on the identified recurring transactions of the past. For example, the recurring transaction service 220 may be configured to identify or estimate future subscription or service fees based on past recurring transactions.

As will be described in the present application, the resource allocation system may be configured to forecast or predict status of a resource pool (e.g., bank account balance, spending power of a user associated with a banking account, etc.) based on operations of the recurring transaction service 220 in combination with other services described herein.

In some embodiments, the resource allocation application 112 may include operations for forecasting recurring resource allocations based on a median value of a threshold number prior recurring transactions. For example, the operations may include forecasting recurring resource allocations based on a median value of the latest three prior data-points in a series of identified recurring transactions.

In some embodiments, the resource allocation application 112 may include operations for determining weekly forecasted dates based on a latest observed recurrence date by adding N×7 days to the latest observed recurrence date, where N may be based on how far in the future forecasting may be desirable.

In some embodiments, the resource allocation application 112 may include operations for determining bi-weekly forecasted dates based on a latest observed recurrence date by adding N×14 days to the latest observed recurrence date, where N may be based on how far in the future forecasting may be desirable.

In some embodiments, the resource allocation application 112 may include operations for determining monthly forecasted dates based on: (i) whether observed recurring resource allocations occur on a "last day of a month" and, if so, determine forecasted resource allocations as of the end of the current month and future months; (ii) whether the latest observed recurrence date+N×1 month is a weekend day (e.g., Saturday or Sunday) and, if so, add days such that the forecasted resource allocations may be for the next business day (e.g., Monday or non-holiday day); or (iii) whether the latest observed recurrence date+N×1 month is prior to the forecasted date (e.g., expected date) and, if so, default the forecasted date to the expected date. In the present example, if none of the three conditioned operations are satisfied, the resource allocation application 112 may determine that the date for forecasting resource allocations to be the latest observed recurrence date+(N×1 month).

To illustrate operations of the resource allocation application 112, Table 7 outlines illustrating examples for determining dates on which the resource allocation application 112 may forecast resource allocations.

TABLE 7

Examples illustrating determining dates for forecasting resource allocations

| | |
|---|---|
| Bi-weekly date forecasts | latest observed bi-weekly recurring transaction occurred on May 14, 2019. If forecast from date is Jun 1st, and forecast to date is June 30th. Then three forecasts should be produced for: May 28, 2019 (May 14+ (14 × 1) days) and Jun. 11, 2019 (May 14 + (14 × 2) days) and Jun. 25, 2019 (May 14 + (14 × 3) days) |
| Monthly date forecasts | latest observed monthly recurring transaction occurred on Feb. 28, 2019. If forecast from date is Mar 15th and forecast to date is Apr 15th, and if the observation dates prior to Feb 28th are Jan 31st, and Dec 31st. Then one forecast should be produced for: Mar. 31st, 2019 |
| Monthly date forecasts | latest observed monthly recurring transactions occurred on May 14, 2019. If forecast from date is June 14th and forecast to date is July 1st. Then one forecast should be produced for: Jun. 14th, 2019 |
| Monthly date forecasts | latest observed monthly recurring transaction occurred on Jun. 14. 2019. If forecast from date is June 14th and forecast to date is June 30st. Then one forecast should be produced for: Jul. 15th, 2019. This as July 14th is a Sunday |
| Monthly date forecasts | latest observed monthly recurring transaction occurred on May 14, 2019. If forecast from date is June 16th and forecast to date is July 1st. Then one forecast should be produced for: Jun. 16th, 2019. This as June 14th is pre forecast from date (within 3 days prior) |
| Monthly date forecasts | latest observed monthly recurring transaction occurred on Jun. 16, 2019. If forecast from date is June 14th and forecast to date is July 31st. Then two forecasts should be produced for: June 16th, and Jul. 15th, 2019. This as June 14th is pre forecast from date (within 3 days prior), and as July 14th is a Sunday |

To illustrate an embodiment of the recurring transaction service 220, Table 8 (below) outlines definitions of an example data structure that may be received as an input request for operations of the recurring transaction service 220.

TABLE 8

Example data structure definitions for input request to recurring transaction service

| Element | Description | Example |
|---|---|---|
| userID | Single valued, "string" Unique id per user. | "982341231" |
| transactionCutoff | Forecast from Date, Optional, Default current date | "2019-01-28" |
| predictionCutoff | Forecast to Date Optional, Default 1 month from today | "2019-02-28" |
| transactions | | |
| -accountID | Single valued, "string" | "65457324" |
| -accountType | Account Type, "string" eg. Checking | "creditCard" |
| -txnDate -amount | Date | "2019-02-28" |
| --txnAmount | Integer This data element tells the engine the number of months in future to be predicted | "212.34" |
| --txnCurrency | String Should be consistent per account | "CA" or "CAD" or "Canadian" or other |
| -baseType | String, DEBIT or CREDIT | "DEBIT" |
| -merchantName | String, Optional | "NETFLIX" |
| -txnCategory | Integer | "12" |

TABLE 8-continued

Example data structure definitions for input request to recurring transaction service

| Element | Description | Example |
|---|---|---|
| -txnSubCategory | String | "AUTO_LOAN" |
| -descSimple | Description Simple (A more generic category of description - i.e. 'Paycheck/Salary' --> 'Salary') | "Salary" |
| config | | "weekly": { "allowedGaps": 1, "fuzzyDays": 2, "minRecurringInstances": 5, "fuzzyAmount": 0.2 }, "biweekly": { "allowedGaps": 1, "fuzzyDays": 3, "minRecurringInstances": 5, "fuzzyAmount": 0.2 }, "monthly": { "allowedGaps": 1, "fuzzyDays": 2, "minRecurringInstances": 3, "fuzzyAmount": 0.2, "txAmountSkips": 1 } |
| requesterInfo | Optional. Use the same object as defined in other service e.g. FVO | "requesterinfo": { "lang": "en_CA", "app": "Calendar", "version": "1.0", "deviceinfo": { "deviceModel": "iphone", "deviceOSVersion": "11.0", "devicePlatform": "ios" } } |

Table 9 illustrates an example input request associated with operations of the recurring transaction service 220 and an example output associated with operations of the recurring transaction service 220.

TABLE 9

A representative portion of example input and output associated with operations of the recurring transaction service 220

| Sample Request | Sample Response |
|---|---|
| { "userid": "846939932", "transactionCutoff": "2019-05-01", "predictionCutoff": "2019-06-01", "transactions": [ { "accountId": 6947737, "accountType": "EXPENSE", "amount": 9.99, "baseType": "DEBIT", "category": 1001, "container": "creditCard", "date": "2019-05-23", "description": "SPOTIFY", "merchantName": "SPOTIFY", "subType": "Digital Goods: Media, Books, Movies, Music" }, { "accountId": 6947737, | { "weeklyRecurring": [ ], "biweeklyRecurring": [ ], "monthlyRecurring": [ { "accountId": 6947737, "accountType": "EXPENSE", "amount": 9.99, "baseType": "DEBIT", "category": 1001, "categoryType": null, "container": "creditCard", "currrencyType": null, "date": "2019-05-23", "description": "SPOTIFY", "merchantName": "SPOTIFY", "subType": "Digital |

TABLE 9-continued

A representative portion of example input and output associated
with operations of the recurring transaction service 220

| Sample Request | Sample Response |
|---|---|
| "accountType": "EXPENSE", "amount": 50.79, "baseType": "DEBIT", "category": 101, "container": "creditCard", "date": "2019-05-18", "description": "TSI INTERNET", "merchantName": "TSI INTERNET", "subType": "Computer Network Services" }, { "accountId": 6947737, "accountType": "EXPENSE", "amount": 9.99, "baseType": "DEBIT", "category": 1001, "container": "creditCard", "date": "2019-04-23", "description": "SPOTIFY", "merchantName": "SPOTIFY", "subType": "Digital Goods: Media, Books, Movies, Music" }, { "accountId": 6947737, "accountType": "EXPENSE", "amount": 50.79, "baseType": "DEBIT", "category": 101, "container": "creditCard", "date": "2019-04-18", "description": "TSI INTERNET", "merchantName": "TSI INTERNET", "subType": "Computer Network Services" }, { "accountId": 6947737, "accountType": "EXPENSE", "amount": 9.99, "baseType": "DEBIT", "category": 1001, "container": "creditCard", "date": "2019-03-23", "description": "SPOTIFY", "merchantName": "SPOTIFY", "subType": "Digital Goods: Media, Books, Movies, Music" }, { "accountId": 6947737, "accountType": "EXPENSE", "amount": 50.79, "baseType": "DEBIT", "category": 101, "container": "creditCard", "date": "2019-03-18", "description": "TSI INTERNET", "merchantName": "TSI INTERNET", "subType": "Computer Network Services" }, { "accountId": 6947737, "accountType": "EXPENSE", "amount": 9.99, "baseType": "DEBIT", "category": 1001, | Goods: Media, Books, Movies, Music" }, { "accountId": 6947737, "accountType": "EXPENSE", "amount": 9.99, "baseType": "DEBIT", "category": 1001, "categoryType": null, "container": "creditCard", "currrencyType": null, "date": "2019-04-23", "description": "SPOTIFY", "merchantName": "SPOTIFY", "subType": "Digital Goods: Media, Books, Movies, Music" }, { "accountId": 6947737, "accountType": "EXPENSE", "amount": 9.99, "baseType": "DEBIT", "category": 1001, "categoryType": null, "container": "creditCard", "currrencyType": null, "date": "2019-03-23", "description": "SPOTIFY", "merchantName": "SPOTIFY", "subType": "Digital Goods: Media, Books, Movies, Music" }, { "accountId": 6947737, "accountType": "EXPENSE", "amount": 9.99, "baseType": "DEBIT", "category": 1001, "categoryType": null, "container": "creditCard", "currrencyType": null, "date": "2019-02-23", "description": "SPOTIFY", "merchantName": "SPOTIFY", "subType": "Digital Goods: Media, Books, Movies, Music" }, { "accountId": 6947737, "accountType": "EXPENSE", "amount": 9.99, "baseType": "DEBIT", "category": 1001, "categoryType": null, "container": "creditCard", "currrencyType": null, "date": "2019-01-23", "description": "SPOTIFY", "merchantName": "SPOTIFY", "subType": "Digital Goods: Media, Books, Movies, Music" } ], ... |

TABLE 9-continued

A representative portion of example input and output associated
with operations of the recurring transaction service 220

| Sample Request | Sample Response |
|---|---|
| | "container": "creditCard",<br>"date": "2019-02-23",<br>"description": "SPOTIFY",<br>"merchantName": "SPOTIFY",<br>"subType": "Digital Goods: Media, Books, Movies, Music"<br>}, ... |

In some embodiments, the recurring transaction service 220 may include operations for retaining data entries associated with resource allocations having a resource value greater than a threshold value. In some embodiments, the operations for retaining data entries associated with resource allocations when identified recurring resource allocations may be associated with identified whitelists associated with category IDs/subtypes, merchant names, or other received parameters associated with recurring transaction rules received at the model orchestrator service 210.

Referring still to FIG. 2, in some embodiments, the model orchestrator 210 may be configured as an interface to a time-series forecasting service 230. In the present example, the time-series forecasting service 230 may be code-named "Seer".

The time-series forecasting service 230 may include processor-executable instructions that, when executed by a processor, configure the processor to predict or forecast future resource allocations or resource transactions of a user. In some embodiments, the time-series forecasting service 230 may be configured to generate predicted resource allocations of the user based on prior time-series data associated with resource allocations of the user. As an illustrating example, the time-series forecasting service 230 may forecast the user's projected spend at a particular restaurant establishment (e.g., coffee shop) based on one or more data entries of time-series data from the data sources 260. For instance, the forecasted spend at the particular restaurant establishment may be based on past frequency of the user's spending at that particular restaurant establishment, on calendar entries that may identify that particular restaurant establishment for a meeting, etc.

In some embodiments, the time-series forecasting service 230 may be configured to conduct operations based on a predefined quantity of time-series data. For instance, the predefined quantity of time-series data may be desirable for ensuring sufficient data points for predicting future events. For example, when the time-series forecasting service 230 conducts operations to provide daily resource allocation or resource transaction forecasts, at least 30 days of prior data entries associated with the resource allocation may be desirable. For instance, if the "forecastFromDate" is 2020-02-01 and a daily resource allocation forecast is requested, the time-series forecasting service 230 may require prior data entries associated with resource allocation data that has an earliest transaction date of on or before 2020-01-02.

In another example, when the time-series forecasting service 230 conducts operations to provide weekly resource allocation or resource transaction forecasts, at least 4 weeks of prior data entries associated with the resource allocation may be desirable. For instance, if the "forecastFromDate" is 2020-02-01 and a weekly resource allocation forecast is requested, the time-series forecasting service 230 may require prior data entries associated with resource allocation data that has an earliest transaction date of on or before 2020-01-10. In the present example, not all time entries may include data indicating a resource allocation, as a user may not have conducted any resource allocations or transactions during the associated dates.

In some embodiments, the time-series forecasting service 230 may be configured to conduct operations based on time-series data that excludes identified outlier data entries. As an illustrating example, the model orchestrator 210 or the view orchestrator 270 may receive time-series data from one or more data sources 260 and may conduct operations to identify outlier data entries based on an interquartile range (IQR) approach. For instance, IQR may be equal to a difference between data entries associated with the $75^{th}$ percentile and $25^{th}$ percentile (e.g., between upper and lower quartiles, where IQR=Q3−Q1).

In some embodiments, the time-series forecasting service 230 may be configured to identify outlier data entries based on an "outlierMultiplier" parameter. For instance, an upper bound parameter may be equal to Q3+IQR*outlierMultiplier=Q3+(Q3−Q1)×outlierMultiplier. In some embodiments, when the "outlierMultiplier" is other than a value of 1, the upper bound may be greater than or less than a default 75th percentile.

To illustrate an embodiment of the time-series forecasting service 230, Table 10 (below) outlines definitions of an example data structure that may be received as an input request for operations of the time-series forecasting service 230.

TABLE 10

Example data structure definitions for input
request to time-series forecasting operations

| Element | Description | Example |
|---|---|---|
| account_id | Single valued, String | "65457324" |
| forecastFromDate | Date to forecast from, date, Default today's date | "2019-05-05" |
| frequency | Prediction frequency, ("daily" or "weekly"), String, Default "weekly" | "weekly" |
| predictSteps | Number of steps to predict into the future, Integer, Default 4 | 4 |
| outlierMultiplier | Interquartile multiplier value for range limits are the typical upper and lower whiskers of a box plot. Integer Default 1 | 3 |
| error_type | Scoring metrics. ("RMSE", "MAPE", "MAE"), String, Default "RMSE" | "RMSE" |
| algorithms | Which algorithm(s) to be run. ("arima", "auto_arima", "ets", "tbats", "prophet"), a List of String, Default '["ets"]'. | ["auto_arima", "ets"] |

TABLE 10-continued

Example data structure definitions for input
request to time-series forecasting operations

| Element | Description | Example |
|---|---|---|
| transactions | | |
| -ds | Transaction Data Stamp, Date | "2019-02-28" |
| -y | Transaction value, Integer | "100" |
| -cat | Sub Category of the transaction | "Groceries" |

Table 11 illustrates an example input request associated with operations of the time-series forecasting service 230 and an example output associated with operations of the time-series forecasting service 230.

TABLE 11

Example time-series data input and output associated with
operations of the time-series forecasting service 230

| Sample Request | Sample Response |
|---|---|
| {<br>　"account id": "6947737",<br>　"forecastFromDate": "2020-02-01",<br>　"frequency": "weekly",<br>　"predictSteps": 2,<br>　"outlier_multiplier": 1,<br>　"error_type": "rmse",<br>　"algorithms": ["ets"],<br>　"transactions": [<br>　　{<br>　　　"ds": "2020-01-03",<br>　　　"y": 1130<br>　　}, ...<br>　　{<br>　　　"ds": "2020-01-10",<br>　　　"y": 900<br>　　},<br>　　{<br>　　　"ds": "2020-01-17",<br>　　　"y": 1130<br>　　},<br>　　{<br>　　　"ds": "2020-01-24",<br>　　　"y": 800<br>　　},<br>　　{<br>　　　"ds": "2020-01-24",<br>　　　"y": 1800<br>　　}<br>　]<br>} | {<br>　"Forecast": [<br>　　{<br>　　　"ds":<br>　　　"2020-02-07",<br>　　　"y": 1130.0<br>　　},<br>　　{<br>　　　"ds":<br>　　　"2020-02-14",<br>　　　"y": 900.0<br>　　}<br>　],<br>　"Val Accuracy Level": 9<br>} |

Figure 3:
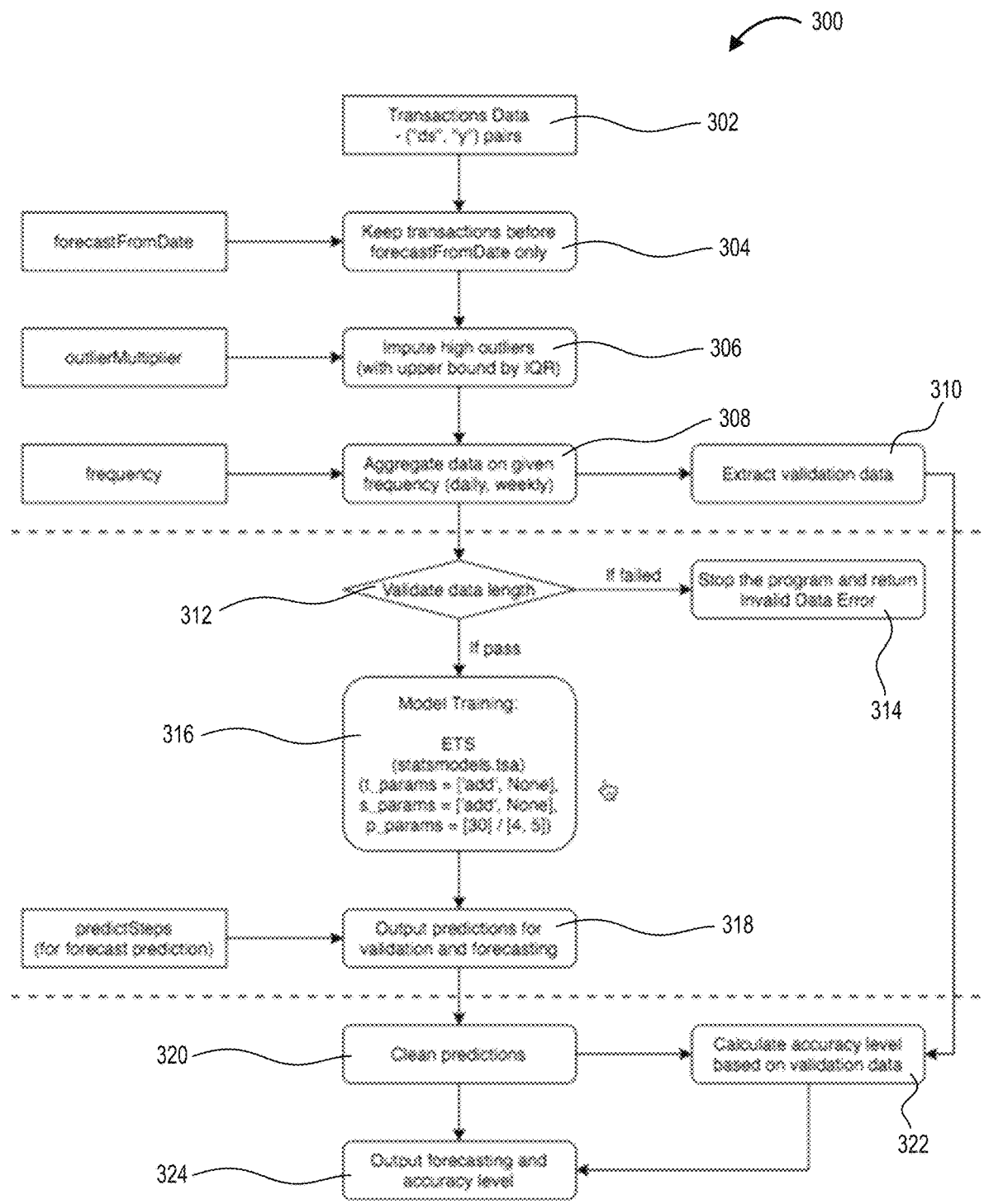
FIG. 3 illustrates a flowchart of a method of predicting or forecasting future resource allocations or resource transactions of a user, in accordance with an embodiment of the present application.

To illustrate example features of the time-series forecasting service 230 described in the present application, reference is made to FIG. 3, which illustrates a flowchart of a method 300 of predicting or forecasting future resource allocations or resource transactions of a user, in accordance with an embodiment of the present application. The method 300 may be conducted by the processor 102 of the system 100 (FIG. 1). The processor readable instructions may be stored in the memory 106 and may be associated with the resource allocation application 112 or other applications not illustrated in FIG. 1.

At 302, the processor may obtain transaction data from one or more data sources. As an illustrating example, the transaction data may be a series of data entries having the format (transaction date stamp (ds), transaction value (y)) to provide a transaction data entries. Other transaction data formats may be contemplated.

In some embodiments, the processor may conduct operations to process the obtained transaction data. For example, the transaction data may include data entries that may be incomplete (e.g., null values, missing values, etc.), may include data entries having undesirable outlier data, or may include data entries that may be outside a predefined scope for the resource allocation forecasting.

For example, at 304, the processor may conduct operations to retain transaction data entries that are associated with a date value that is prior to a date associated with a variable "forecastFromDate".

At 306, the processor may conduct operations to identify outlier data entries based on an interquartile range analysis, and may conduct operations to disregard identified undesirable outlier data entries. In some embodiments, operations to identify outlier data entries may be based on an "outlier-Multiplier" parameter (described in an example of the present application) in combination with an interquartile range analysis.

At 308, the processor may conduct operations to aggregate or group data entries based on a desirable time frequency (e.g., daily, weekly, bi-weekly, monthly, etc).

In some embodiments, the processor may conduct other operations to pre-process obtained transaction data prior to conducting operations to forecast or predict future resource allocations.

At 310, the processor may allocate a subset of the pre-processed data entries as a training data set and a subset of the pre-processed data entries as a validation data set. The training data set may include data entries for training a learning model.

The validation data set may be a portion of the pre-processed transaction data that may be used to provide an unbiased evaluation of the trained model following processing of the training data set. In some examples, the processor may also tune learning model hyper-parameters based on the validation data set. At 322, the processor may determine resource allocation forecasting accuracy based on the validation data set.

At 312, the processor may determine whether a data length of pre-processed data entries may correspond to a predefined data length. In some embodiments, operations for forecasting future resource allocations may include learning models having specified data length requirements. Accordingly, when the processor determines that a data length of a pre-processed data entry may not correspond to a predefined data length, the processor may, at 314, generate a data error message and halt operations for forecasting resource allocations at a future point in time.

At 316, the processor may conduct operations of a learning model for determining forecasted resource allocations. In one embodiment, the learning model may be based on operations of exponential smoothing for smoothing time-series data based on an exponential window function. For instance, exponential functions may be used to associate exponentially decreasing weights over time (whereas operations of a simple moving average may highlight past observations weighted equally). As an illustrating example, operations of exponential smoothing may be based on a holt winters smoothing model and having features for trend and seasonality parameters. For example, the smoothing model may be based on parameters (t,s,p), where t may indicate whether there is a trend, s may indicate whether there may be seasonality, and p may refer to a number of periods in each season. To illustrate, operations based on exponential smoothing may be based on: "t_params=['add', None], s_params=['add', None], p_params=[30]/[4,5]).

In some embodiments, at 316, the processor may conduct operations of other learning models. For example, the processor may conduct operations based on an autoregressive integrated moving average (ARIMA) model, which may be a generalization of an autoregressive moving average (ARMA) model. The ARIMA model may be fitted to time-series data for determining characteristics of the data or to forecast future data points in the time-series data. In some examples, ARIMA models may be applied in situations of non-stationarity, where initial differencing step may be applied one or more times to reduce non-stationarity. In some examples, the ARIMA model may be based on parameters: (p,d,q), where p may be the order (number of time lags) of the autoregressive model, d may be the degree of differencing (the number of times the data have had past values subtracted), and q may be the order of the moving-average model.

In some embodiments, at 316, the processor may conduct operations of an ARIMA model with seasonal ARIMA, where seasonal ARIMA may add seasonal effects (seasonality to ARIMA models). The seasonal ARIMA model may be based on $(p,d,q)(P,D,Q)_m$, where m refers to the number of periods in each season, and the uppercase P,D,Q refer to the autoregressive, differencing, and moving average terms for the seasonal part of the ARIMA model.

In some embodiments, at 316, the processor may conduct operations of a curve fitting model (e.g., PROPHET forecasting model) for forecasting time-series data based on an additive model. The curve fitting model may be based on an additive model where non-linear trends are fit with yearly, weekly, and daily seasonality, plus holiday effects. In some situations, the curve fitting model may be suitable when time series data have strong seasonal effects, and when the time series data includes multiple seasons of historical data. In some scenarios, the curve fitting model may be suitable when missing data, data trend shifts, or outliers data entries are present.

In some embodiments, at 316, the processor may conduct operations of a transformation and regression model (e.g., TBATS). The transformation and regression model may be a time-series model having one or more complex seasonalities, and having features including: trigonometric regressors to model multiple-seasonalities, box-cox transformations, ARMA errors, trends, and/or seasonality. In some examples, the TBATS model may be based on default parameters of a TBATS model.

In some embodiments, the processor may conduct operations of one or a combination of the learning models described herein. In embodiments when the processor may conduct operations of two or more learning models in parallel, the processor may conduct operations for comparing the results of the respective learning models and identifying the output from one of the learning models as most desirable based on an evaluation criterion. The evaluation criterion may be based on validation data identified at 310.

In some embodiments, the time-series forecasting service 230 may include operations for: identifying outlier data entries, determining data entry mean values, grouping transactions based on frequency periods (e.g., weekly, bi-weekly, etc.), imputing data entries as "0" where data entries may be missing, or conducting operations of multiple learning models in parallel for providing predictions and identifying a "best case" forecast output based on previously identified evaluation data sets.

At 318, the processor may identify output predictions for validation and resource allocation forecasting based on learning model outputs.

At 320, the processor may pre-process the output predictions. In some embodiments, pre-processing the output predictions may include transforming the output predictions into a desired data format for comparison with previously identified validation data.

At 322, the processor may determine an accuracy level of output predictions based on previously identified validation data.

At 324, the processor may generate a resource allocation forecast. In some embodiments, the processor may associate an accuracy level measure to indicate a confidence level of the resource allocation forecast to a user.

Referring again to FIG. 2, in some embodiments, the model orchestrator 210 may be configured as an interface to an anomaly detection service 240. In the present example, the anomaly detection service 240 may be code-named "Sherlock".

The anomaly detection service 240 may include processor-executable instructions that, when executed by a processor, configure the processor to identify resource allocations or resource transactions that are may be infrequent or may be different based on a predefined set of attributes. As an illustrating example, the anomaly detection service 240 may conduct operations to identify that a value of a beverage purchase may be greater than a threshold value amount as compared to purchases in similar categories of purchases. Further, a beverage purchase that may have a date or time stamp value nearer to a prior beverage purchase than usual may be identified as an anomalous resource transaction.

In some embodiments, the anomaly detection service 240 may include operations for identifying resource allocations that may be an anomalous resource transaction on a per user transaction basis. In some embodiments, the anomaly detection service 240 may include operations for identifying new merchant entities who may receive resource transfers from a user.

To illustrate an embodiment of the anomaly detection service 240, Table 12 (below) outlines definitions of an example data structure that may be received as an input request for operations of the anomaly detection service 240.

TABLE 12

Example data structure definitions for input request to anomaly detection operations

| Element | Description | Example |
|---|---|---|
| anomalyFromDate | Date, Date to show anomalies from. If any were found. Defaults to min dataset date. | "2019-02-28" |
| contamination | Float in (0., 0.5), The proportion of outliers in the data set Defaults to .001 | .005 |
| outputAnomaly | String, "True" or "False", Defaults to "True". Indicating whether to perform and output anomaly detection or not. | "True" |

TABLE 12-continued

Example data structure definitions for input request to anomaly detection operations

| Element | Description | Example |
| --- | --- | --- |
| explain | String, "True" or "False", Defaults to "False". Indicating whether to output anomaly detection details. | "False" |
| outputNew | String, "True" or "False", Defaults to "False". Indicating whether to perform and output new merchants detection or not. | "False" |
| data | | |
| -accountID | Single valued, "string" | "65457324" |
| -container | Single valued, "string" | "creditCard" |
| -txnDate | Date | "2019-02-28" |
| -txnAmount | Integer This data element tells the engine the number of months in future to be predicted | "212.34" |
| -txnCurrency | String Should be consistent per account | "CA" or "CAD" or "Canadian" or other Distinct values expected |
| -baseType | String DEBIT or CREDIT | "DEBIT" |
| -txnCategory | Integer | "12" |
| -txnSubCategory | String | "AUTO_LOAN" |
| -descSimple | Description Simple (A more generic category of description - i.e. 'Paycheck/Salary' --> 'Salary'). descSimple can also be a simplified description of the merchantName | "Salary" |

Table 13 illustrates an example input request associated with operations of the anomaly detection service 240 and an example output associated with operations of the anomaly detection service 240.

TABLE 13

Example input and output associated with operations of the anomaly detection service 240

| Sample Request | Sample Response |
| --- | --- |
| {<br>　"contamination": 0.01,<br>　"anomalyFromDate": "2017-08-01",<br>　"outputAnomaly": "True",<br>　"outputNew": "True",<br>　"explain": "False",<br>　"data": [<br>　　{<br>　　　"accountID": "6947737",<br>　　　"container": "creditCard",<br>　　　"baseType": "DEBIT",<br>　　　"txnDate": "2018-08-17",<br>　　　"txnAmount": 11.3,<br>　　　"txnCurrency": "CAD",<br>　　　"txnCategory": "1003",<br>　　　"txnSubCategory": "5138",<br>　　　"descSimple": "STARBUCKS 04817"<br>　　}<br>　]<br>} | {<br>　"anomalies": [ ],<br>　"new": [<br>　　{<br>　　　"accountID": "6947737",<br>　　　"baseType": "DEBIT",<br>　　　"container": "creditCard",<br>　　　"descSimple": "STARBUCKS 04817",<br>　　　"txnAmount": 11.3,<br>　　　"txnCategory": "1003",<br>　　　"txnCurrency": "CAD",<br>　　　"txnDate": "Fri, 17 Aug 2018 00:00:00 GMT",<br>　　　"txnSubCategory": "5138"<br>　　}<br>　]<br>} |

In some embodiments, the anomaly detection service 240 may include operations for receiving time-series data associated with resource allocations or resource transactions, may conduct operations for model fitting and predictions, and may identify one or more data entries as anomalous transactions based on date stamps, data categories, vendor identification, etc.

In some embodiments, the anomaly detection service 240 may include operations based on unsupervised learning operations, such as isolation forests. Other operations determining anomaly data entries may be contemplated.

Referring again to FIG. 2, in some embodiments, the view orchestrator 270 may be configured as an interface to a data cleansing service 250. In the present example, the data cleansing service 250 may be code-named "Scrubs". In some embodiments, the data cleansing service 250 may include operations for simplifying or reformatting data entries or descriptors. For example, the text string 'Spotify #1234' may be reformatted as a text string "SPOTIFY". In another example, the text string "APL*ITUNES.com/BILL 555-555-5555 ON" may be reformatted as a text string "iTunes". In some embodiments, merchant name extraction/simplification/reformatting may be based on learning models identifying patterns.

In some embodiments, the data cleansing service 250 may be configured to determine categorical fields from data sets for identifying categories and/or sub-categories for grouping data entries of time-series data sets.

In some embodiments, the resource allocation application 112 may include operations for generating data entries associated with a resource pool value. For examples, the resource allocation application 112 may include operations for determining a time-based forecasted resource pool value based on a combination of identified recurring resource allocations and non-recurring resource data. As an illustrating example, the resource allocation application 112 may determine a forecasted resource pool value based on: (i) a current resource pool value (e.g., current account balance), (ii) recurring resource income value, (iii) recurring expenses (e.g., expenses of a banking institution user), (iv) other forecasted expenses, and/or (v) other income credit forecasts. Other operations for determining a forecasted resource pool value may be contemplated.

In some embodiments, the resource allocation application 112 may include operations for dynamically comparing a forecasted resource pool value may be less than or equal to a threshold value. In situations when a forecasted resource pool value may be less than or equal to a threshold value, the resource allocation application 112 may include operations for generating an alert associated with a time-based metric for alerting a user that a resource pool value may be insufficient for forecasted resource transactions or forecasted resource allocations.

Embodiments in the present application are directed to resources pools, which may include resources such as computing resources, precious metals, digital tokens, securities (e.g., stocks, derivatives, or the like), currency, real estate, or any other resource that may be transferred from one entity to another entity. In some embodiments, data records may store data associated with resource allocations or transfers associated with one or more entities. In some embodiments, systems and methods described herein may conduct operations for facilitating management of a time-varying resource pool.

Figure 4:
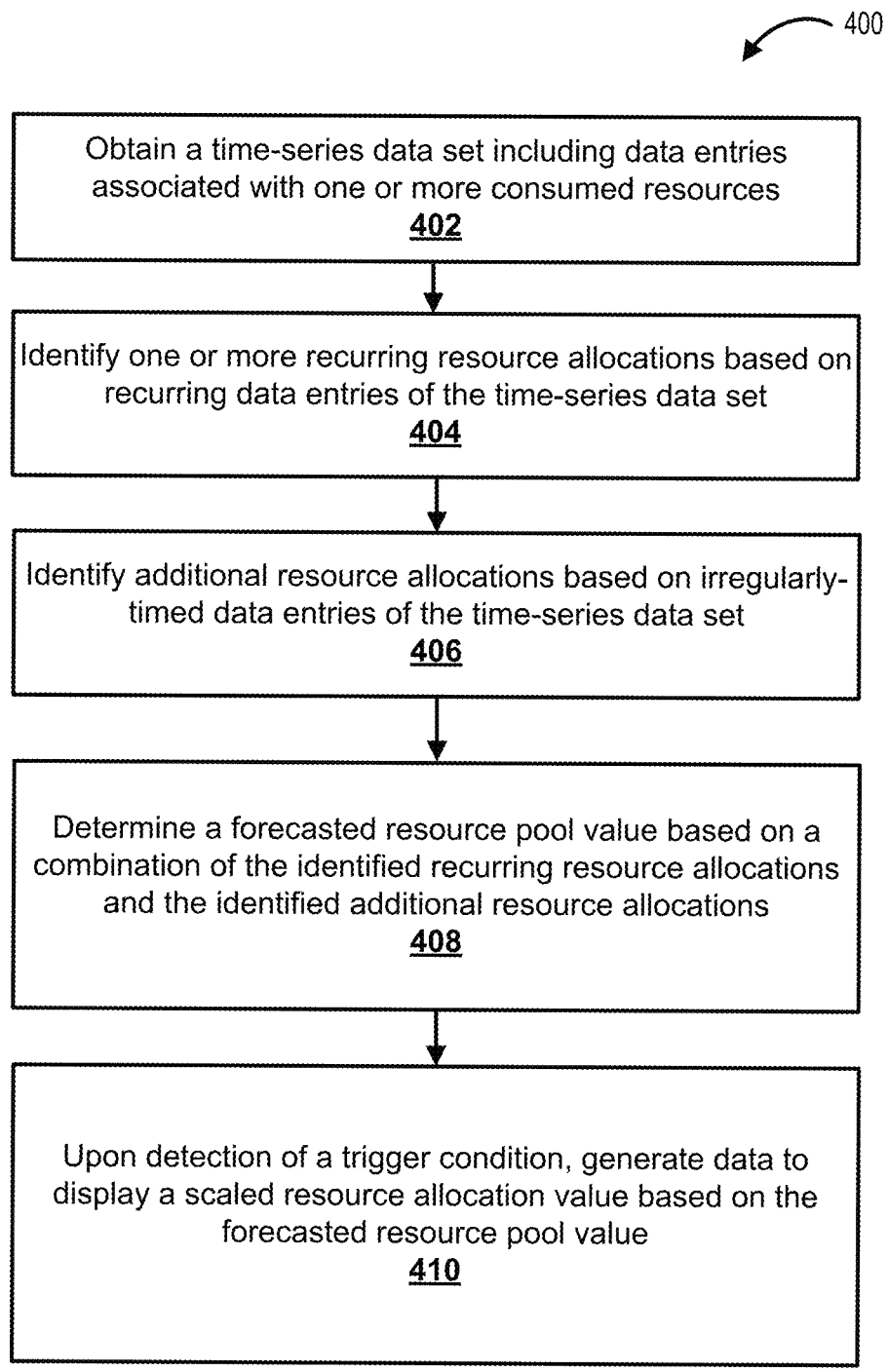
FIG. 4 illustrates a flowchart of a method of facilitating management of a time-varying resource pool, in accordance with an embodiment of the present application.

Reference is made to FIG. 4, which illustrates a flowchart of a method 400 for facilitating management of a time-varying resource pool, in accordance with an embodiment of the present application. The method 400 may be conducted by the processor 102 of the system 100 (FIG. 1). The processor readable instructions may be stored in memory and may be associated with the resource allocation application or other applications not illustrated in FIG. 1.

It will be appreciated that systems described in the present application may be used for non-banking institutions and may be configured to quantify data sets associated with a variety of types of time-varying resource pools. For instance, time-varying resource pools may be computing resources, such as memory resources, computational processing resources, or the like. Such memory resources or computational processing resources may be allocated on a recurring basis (e.g., scheduled computing tasks) or may be allocated on a non-recurring basis. As such, the computational processing resources may have a resource pool value that may vary over time.

For ease of exposition and to illustrate features of the present application, the method 400 will be described with an example relating to a system associated with a banking institution. The banking institution may provide banking accounts to users. Users may access data sets associated with the banking accounts via a client device 110 (FIG. 1). The client device 110 may be configured to display, via a user interface, scaled resource allocation values corresponding to time-based metrics.

At 402, the processor may obtain a time-series data set including data entries associated with one or more consumed resources. In some embodiments, consumed resources may be one or more prior resource allocations. In some embodiments, the time-series data set may include data entries associated with transfer of resources to an account of a user or transfer of resources from an account of a user. An account may be a resource pool that may be associated with a user. In an illustrating example, a time series data set may include banking account transaction data (e.g., transfer of money into a user banking account or transfer of money from a user banking account to a third party banking account).

In some embodiments, the time-series data set may be obtained by the system 100 from the data storage 114 (FIG. 1). In some other embodiments, the time-series data set may be received from other computing devices external to the system 100. For instance, time-series data set may be received from a source device 120 (FIG. 1), which may be a third-party device.

In some embodiments, the source device 120 may be a data aggregation device for collecting and transforming collected data into time-series data sets for analysis. In some embodiments, the source device 120 may receive data associated with users from a variety of data sources, such as social media accounts, credit card accounts at other banking institutions, Internet-based calendar data from Internet-based service providers, or other types of entities storing data associated with resource allocations or resource transactions associated with users.

In some situations, source devices 120 may provide time-series data sets to the system 100 (FIG. 1) at fixed points in time. In some other situations, transfer of time-series data sets from source devices 120 to the system 100 may include large volumes of data, and the transfers of large volumes of data may require extended durations of time. Such time delay or time lag may cause a user of the system 100 or the client device 110 to experience delay when an updated forecasted resource pool value or scaled resource allocation value may be sought. It may be desirable to configure the system 100 to pre-emptively obtain time-series data sets, such that a user may receive timely forecasted resource pool values or scaled resource allocation values (e.g., not get impression that the system may be providing inaccurate data or may be not operational). Accordingly, in some embodiments, obtaining the time-series data set may be triggered based on detected resource allocations altering a time-varying resource pool value greater than a threshold amount. For instance, when the processor determines that a resource allocation may alter a resource pool value more than a defined value or ratio (for example, the defined value may be a small or an insignificant value amount or may be a ratio of the size of the resource allocation to the size of the resource pool), the processor may conduct operations to pre-emptively update the forecasted resource pool value, such that generation of data for displaying scaled resource allocation values or forecasted resource pool values may be in substantially real-time, or that displaying the scaled resource allocation values may occur with greater speed.

At 404, the processor may identify one or more recurring resource allocations based on recurring data entries of the time-series data set. In some embodiments, identifying one or more recurring resource allocations may be based on heuristics. In some embodiments, the heuristics may include rules-based pattern recognition operations for identifying recurring resource allocations (e.g., monetary payments, computing resource allocations, etc.) that recur on substantially periodic time-basis. For instance, a banking institution user may conduct recurring bill payments to a video-streaming provider or utility provider on a recurring basis (e.g., monthly). In another example, the banking institution user may receive a periodic salary payment on a recurring basis (e.g., bi-weekly—once every two weeks). Accordingly, the processor, at operation 404, may identify recurring resource allocations based on the time-series data set.

In some embodiments, to increase the accuracy of identified recurring resource allocations, it may be desirable that the time-series data set include a minimum threshold number of data entries that have occurred over a threshold number of periodic cycles (e.g., greater than 5 bi-weekly cycles).

In some embodiments, the rules-based pattern recognition may include time-based threshold margins for identifying the one or more recurring resource allocations in the time-series data set. For example, monthly resource allocations (e.g., payment of a utility provider invoice) may require that the allocation be conducted on a regular business day (e.g., Monday to Friday). In the event that the first day of a month may be on a Saturday, a Sunday, or a holiday, it may be desirable to include time-based threshold margins for identifying recurring resource allocations that may not occur on a first official day of a month. In one example, a time-based threshold margin may be setup as 2 days, such that if a resource allocation scheduled for the first day of the month falls on a Saturday, the processor may recognize that the resource allocation occurring on the third day of that month is in a series of recurring resource allocations.

In some embodiments, the rules-based pattern recognition may be based on resource allocation categories. For example, the processor may conduct operations to identify resource allocations related to restaurant establishments, and identify recurring resource allocations over time of a user dining at restaurant establishments. Other rules-based pattern recognition criteria for identifying recurring resource allocations over time may be contemplated, as illustrated in examples described herein or otherwise.

At 406, the processor may identify additional resource allocations based on irregularly-timed data entries of the time-series data set. In some embodiments, irregularly-timed data entries may be successive data entries that may not be regularly spaced (e.g., time series data corresponding to purchasing coffee at a coffee shop: (i) sometimes every two days, and (ii) sometimes every three days). In the present example, at 406, the processor may identify additional resource allocations (e.g., coffee purchases) that may not follow a strict time-interval pattern, but may follow a loose time-interval pattern.

In some embodiments, the processor may identify these additional resource allocations that are based on irregularly-timed data entries based on one or more learning models described herein. In some embodiments, the processor may conduct operations of two or more learning models, where respective learning model operations may be conducted on a given time-series data set independently/in parallel. In the present example, the processor may identify an output of the respective learning models and identify an output associated with a learning model having a lowest error. This output of a learning model having the lowest error may be used for subsequent operations for determining forecasted resource pool values.

In some alternative embodiments, the processor may identify non-recurring resource data associated with the identified one or more recurring resource allocations. In some embodiments, non-recurring resource data may include one or more data entries associated with contextual information from social media platforms, Internet-based calendar platforms, applications stored on a client device associated with a user, or other types of resource data that may be associated with resource allocations.

For instance, non-recurring resource data may include data entries, such as a calendar entry, indicating that a user may be booking a trip (e.g., vacation or work-related travel), and data entries associated with the potential upcoming trips may be applicable to inferences regarding future resource allocations or resource transactions. In another example, the non-recurring resource data may be a category of resource allocation that may be related to an identified recurring resource allocations, but may not be recurring (e.g., recurring purchase of gasoline for a car, related to wear and tear on tires and purchase of tires may be non-recurring and related to recurring purchase of gasoline over time). Other examples may be contemplated.

In some embodiments, the non-recurrent resource data may include identified outlier data identified among the time-series data set. As an illustrating example, the processor may conduct operations of unsupervised learning algorithms for detecting anomaly data entries in the series of data entries based on principles of isolating anomalies (e.g., isolation forests) for profiling data entries in a data set.

At 408, the processor may determine a forecasted resource pool value based on a combination of the identified recurring resource allocations and the identified additional resource allocations. In some embodiments, the processor may determine a forecasted resource pool value based on one or more learning models described herein. In some embodiments, the processor may determine the forecasted resource pool value based on weighted combinations of the identified recurring resource allocations and the identified additional resource allocations. In some embodiments, the processor may ascribe substantially equal weights to the identified recurring resource allocations and the identified additional resource allocations for determining a forecasted resource pool value. In some other embodiments, the processor may ascribe different weights to the respective identified resource allocations. Other methods of combining the identified recurring resource allocations and the identified additional resource allocations may be contemplated.

In some alternative embodiments, the processor may determine a forecasted resource pool value along a projected time-scale based on a combination of the identified recurring resource allocations and the non-recurring resource data. In some embodiments, the forecasted resource pool value may be a data value associated with excess resource available to a user (e.g., a banking account user's cash on hand based on recurring salary income and forecasted spending over a projected period of time—"spending power").

In some embodiments, the projected time-scale may be daily, weekly, bi-weekly, monthly, or any other time period that may be configured by the user. For example, based on identified recurring resource allocations (e.g., incoming salary payments, outgoing utility bill payments, etc.) and non-recurring resource data, the processor may determine a forecasted resource pool value as of a user-specified date or time period. For instance, the user may be interested in the forecasted resource pool value (e.g., amount of disposable income) in the summer season, such that the user may spend on vacation travel. The processor may receive a data message indicating the time period, and the processor may determine the forecasted resource pool value based on a combination of prior identified recurring resource allocations and the non-recurring resource data.

In some embodiments, the projected time-scale may be illustrated on a calendar user interface, where the forecasted resource pool value associated with specific days on a calendar may be illustrated on a user display. The forecasted resource pool value may be different from day-to-day, week-to-week, etc. based on resource allocation flow. For instance, a series of forecasted resource pool values may be akin to an illustrated cash flow analysis based on identified recurring resource allocations and/or forecasted resource pool values.

Upon detection of a trigger condition, the processor, at 410, may generate data to display, via a user interface, a scaled resource allocation value based on the forecasted resource pool value. The scaled resource allocation value may correspond to at least one time-based reference. In some embodiments, the at least one time-based reference includes one or more successive dates along a time spectrum. In some embodiments, the at least one time-based reference includes a group of dates along a time spectrum (e.g., groups of three days, etc.).

In some embodiments, the scaled resource allocation value may be a future resource pool value that corresponds to a time-based metric. For example, the time-based metric may be a future date/time, and the scaled resource allocation value may be a weighted resource allocation value that provides an indication of a user's ability to allocate resources over the next several days, next several weeks, or next several months. As an example, the scaled resource allocation value may be a suggested daily spending budget. In some examples, the at least one time-based metric may include one or more series of dates along a time spectrum, such as a series of dates on a calendar.

In some embodiments, the scaled resource allocation value may be a weighted value based on the forecasted resource pool value and the time-based reference.

In some embodiments, the trigger condition may include an input received on a graphical user interface of the client device 110 for navigating to visual elements associated with the at least one time-based metric. The trigger condition may be triggered when the system 100 receives signals indicating that inputs are received from the client device for navigating to a different view or a portion of the user interface. In some embodiments, the trigger condition may trigger the processor to conduct operations for determining a forecasted resource pool value or other data, such as recurring resource allocations, prior to the data being needed for generating a user interface. The above features may reduce chances that a user interface is displayed with outdated time-varying resource pool data or reduce chances that the user may infer that the system for quantifying the time-varying resource pool may not be operational.

In some embodiments, the trigger condition may be based on an elapsed time duration satisfying a threshold value. For example, the trigger condition may be a passage of time beyond a threshold value (e.g., passage of 3 days). In some embodiments, the trigger condition may be a passage of time beyond the threshold value and where a forecasted resource allocation may not have completed. For example, the processor may have previously forecasted a resource allocation. If the forecasted resource allocation did not complete (e.g., the user did not end up purchasing a product, even though it was expected that the user would purchase the product), the processor may update the forecasted resource pool value, and display updated resource pool values or display updated scaled resource allocation values. In the present example, the system may be configured to dynamically update time-varying resource pool values for providing updated resource pool information for a user.

In some embodiments, the processor may be configured to generate notification data for display, via a user interface, for indicating when resource allocations may alter a resource pool value or a forecasted resource pool value beyond a resource value threshold.

In some embodiments, generated notification data may include data for alerting a user that a forecasted resource pool value at a particular date/time may meet a particular threshold value (e.g., either above or below), thereby indicating that the user should consider whether to conduct or abstain from forecasted resource allocations. For instance, the generated notification data may be for alerting the user that an expected resource allocation (e.g., monetary expenditure) may cause the overall resource pool value associated with the user to be nearing depletion (e.g., not enough money in bank account or in credit account to undertake forecasted purchases).

In some embodiments, generated notification data may be associated with milestone alerts. For example, the milestone alerts may be inspirational alerts to encourage a user to gradually increase an overall resource pool value over time (e.g., saving money by reducing forecasted spending). In some other examples, the milestone alerts may be alerts to identify whether the user is on-track with recurring resource allocations. In some examples, the milestone alerts may be configured to identify for the user whether there may be outlier resource allocations that may not be in a set of recurring resource allocations. Other types of milestone alerts may be contemplated.

Figure 5:
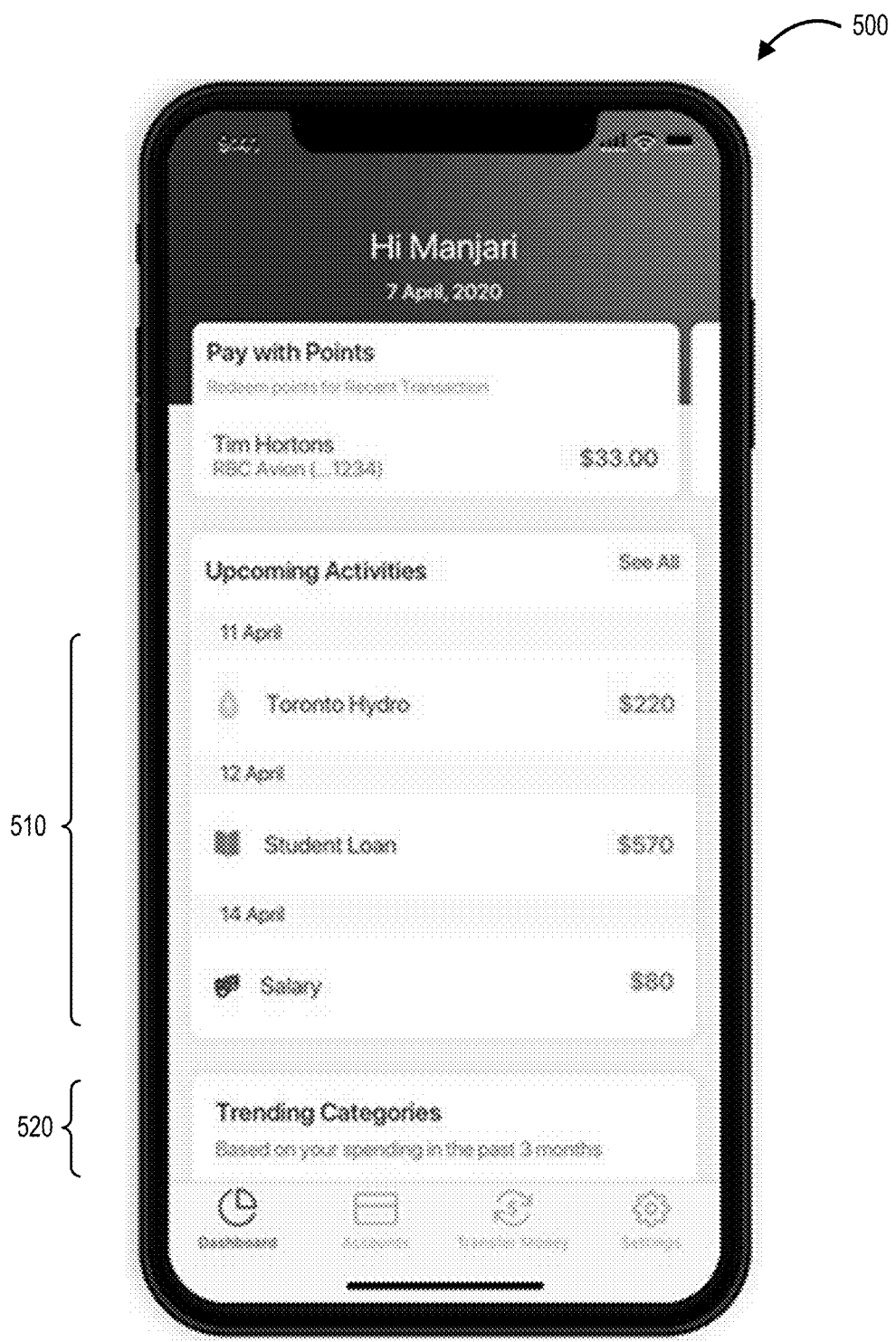
FIG. 5 illustrates a graphical user interface displaying one or more of recurring resource allocations or non-recurring resource data allocations corresponding to at least one time-based reference, in accordance with an embodiment of the present application.

Reference is made to FIG. 5, which illustrates a graphical user interface 500 displaying one or more of recurring resource allocations and/or non-recurring resource data allocations corresponding to at least one time-based metric, in accordance with an embodiment of the present application. In some embodiments, the system 100 and/or the client device 110 may generate data for displaying the graphical user interface 500 to a user.

In some embodiments, a resource pool may include one or more resource components associated with a variety of resource sources. For example, a resource allocation may be associated with a bill payment for a utility provider "Toronto Hydro". In another example, a resource allocation may be associated with a periodic student loan repayment allocation. In another example, a resource allocation may be associated with a periodic salary payment into a user's banking account. Accordingly, the graphical user interface 500 may display a series of forecasted resource allocations 510.

In some embodiments, the series of forecasted resource allocations 510 may include recurring resource allocations identified based on a time-series data set. For example, a resource allocation associated with periodic salary payments may be set resource allocation values (e.g., same salary payment on each pay period).

In some embodiments, the series of forecasted resource allocations 510 may include recurring resource allocations but with a non-standard resource allocation value. For example, a hydro-electric utility invoice may fluctuate from month to month based on external factors that may influence a quantity of electricity usage. For instance, during a summer season when the weather is warmer, a user's hydro-electric usage may be higher than during a winter season. In the present example, the processor may determine that a user's resource pool may include a periodic "Toronto Hydro" resource allocation payment, but the set amount may not be known. Thus, the processor may conduct operations to identify non-recurring resource data (e.g., operation 406 of FIG. 4) that may be identified with the recurring resource allocation (e.g., Toronto Hydro bill payment), and subsequently determine a forecasted resource pool value along a projected time-scale. The present example is simplified to illustrate features of the present application; however, the processor may determine a forecasted resource pool value based on a combination of several identified recurring resource allocations and non-recurring resource data entries.

In some embodiments, the graphical user interface 500 may include a user interface for providing an indication of one or more recurring resource allocations 510, where the recurring resource allocations 510 may be associated with one or more time-based metric (e.g., past 3 months, or the like).

Figure 6:
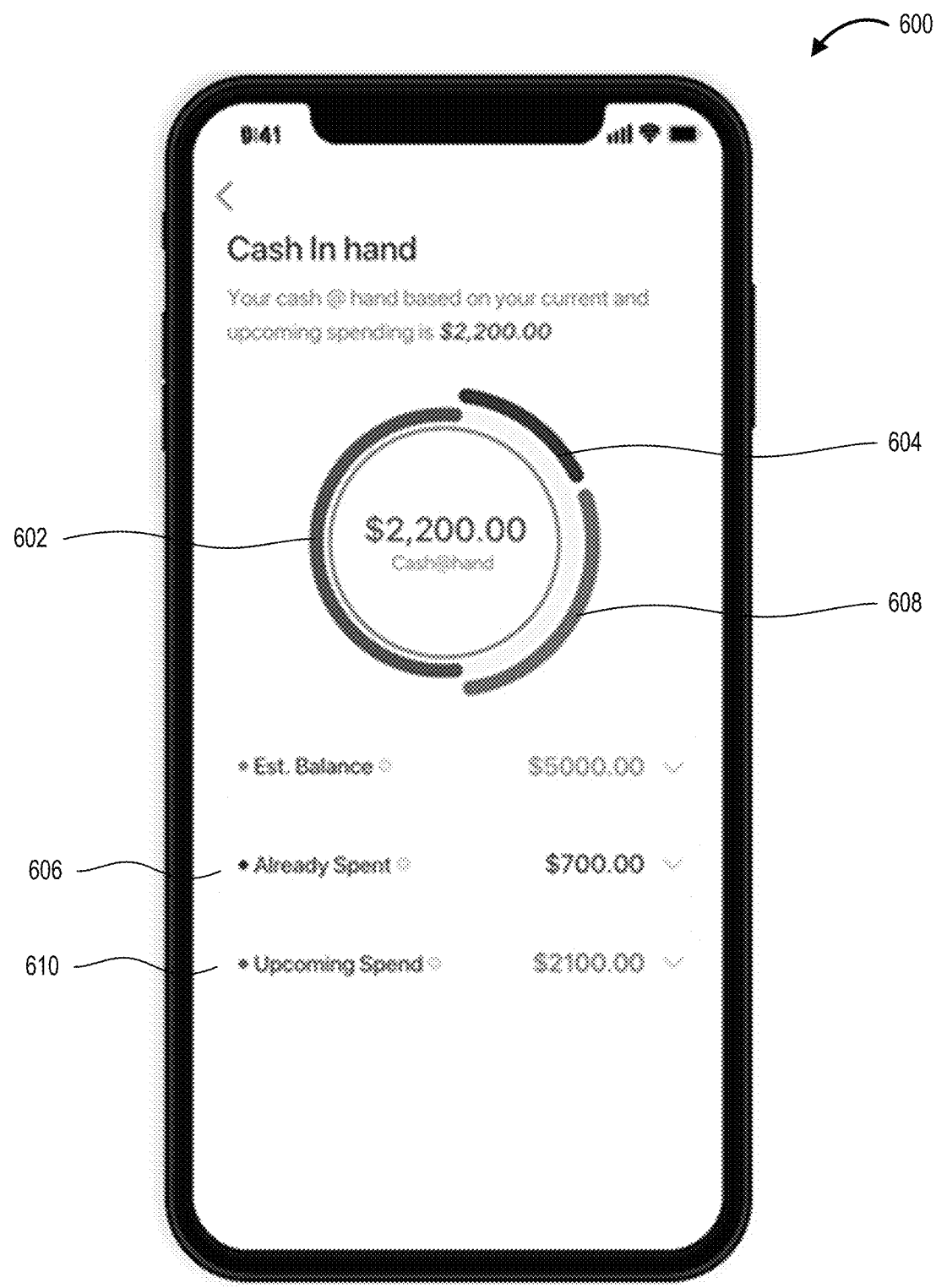
FIG. 6 illustrates a graphical user interface displaying a value associated with a resource pool corresponding to at least one time-based reference, in accordance with an embodiment of the present application.

Reference is made to FIG. 6, which illustrates a graphical user interface 600 displaying one or more values associated with a resource pool corresponding to at least one time-based reference, in accordance with an embodiment of the present application.

In FIG. 6, the graphical user interface 600 may indicate a scaled resource allocation value 602 based on a forecasted resource pool value. For example, the scaled resource allocation value 602 may be an indication of a projected quantity of monetary value that a user may have available for unplanned resource allocations or resource transactions. In the present example, the forecasted resource pool value may be associated with a combination value of a user's banking monetary accounts (e.g., including multiple banking accounts across different banking institutions) or other resource accounts. That is, the determined scaled resource allocation value may be based on time-series data sets received from the data storage 114 (FIG. 1) or source devices 120 (FIG. 1) The scaled resource allocation value 602 may represent a value of resources that the user may have for allocating or for conducting resource transactions.

In FIG. 6, the graphical user interface 600 may include a graphical element 604 associated with prior resource allocations (e.g., money already spent) associated with a particular time-based metric (e.g., within the present month). The graphical user interface 600 may also include a text-based indicator 606 of the prior resource allocations. In some embodiments, the prior resource allocations may include both recurring resource allocations and/or non-recurring resource allocations.

In FIG. 6, the graphical user interface 600 may include a graphical element 608 associated with a forecasted resource allocation value, such as forecasted upcoming resource transfers. The graphical user interface 600 may also include a text-based indicator 610 of the forecasted upcoming resource transfers.

In the example illustrated in FIG. 6, the scaled resolution allocation value 602 may be based on a current resource pool value. In some embodiments, the graphical user interface 600 may include user interface elements for receiving time-based metrics, such that a user may select a future date or a series of future dates for generating a scaled resource allocation value.

In some embodiments, based on a combination of identified recurring resource allocations, identified forecasted resource allocations, and non-recurring resource data, the scaled resolution allocation value 602 may be different on a day-to-day basis along a time spectrum. Referring to the example of FIG. 6, the "cash in hand" value may change based on what future day may be used as the time-based metric. In some embodiments, the graphical user interface 600 may include a user interface element for receiving user input associated with the time-based metric.

In some embodiments, the graphical user interface 600 may include user interface elements for providing alerts or notifications. The alerts or notifications may be associated with milestone notifications (e.g., reaching monetary value saving goals). In some examples, the alerts or notifications may indicate that outlier resource allocations have been detected. In some examples, the alerts or notifications may indicate that a resource pool value may reach a threshold value, such as when the resource pool value may decrease below a threshold value. This alert or indication may provide the user with information that the resource pool value may not be sufficient to accommodate future resource allocations/transactions.

Figure 7:
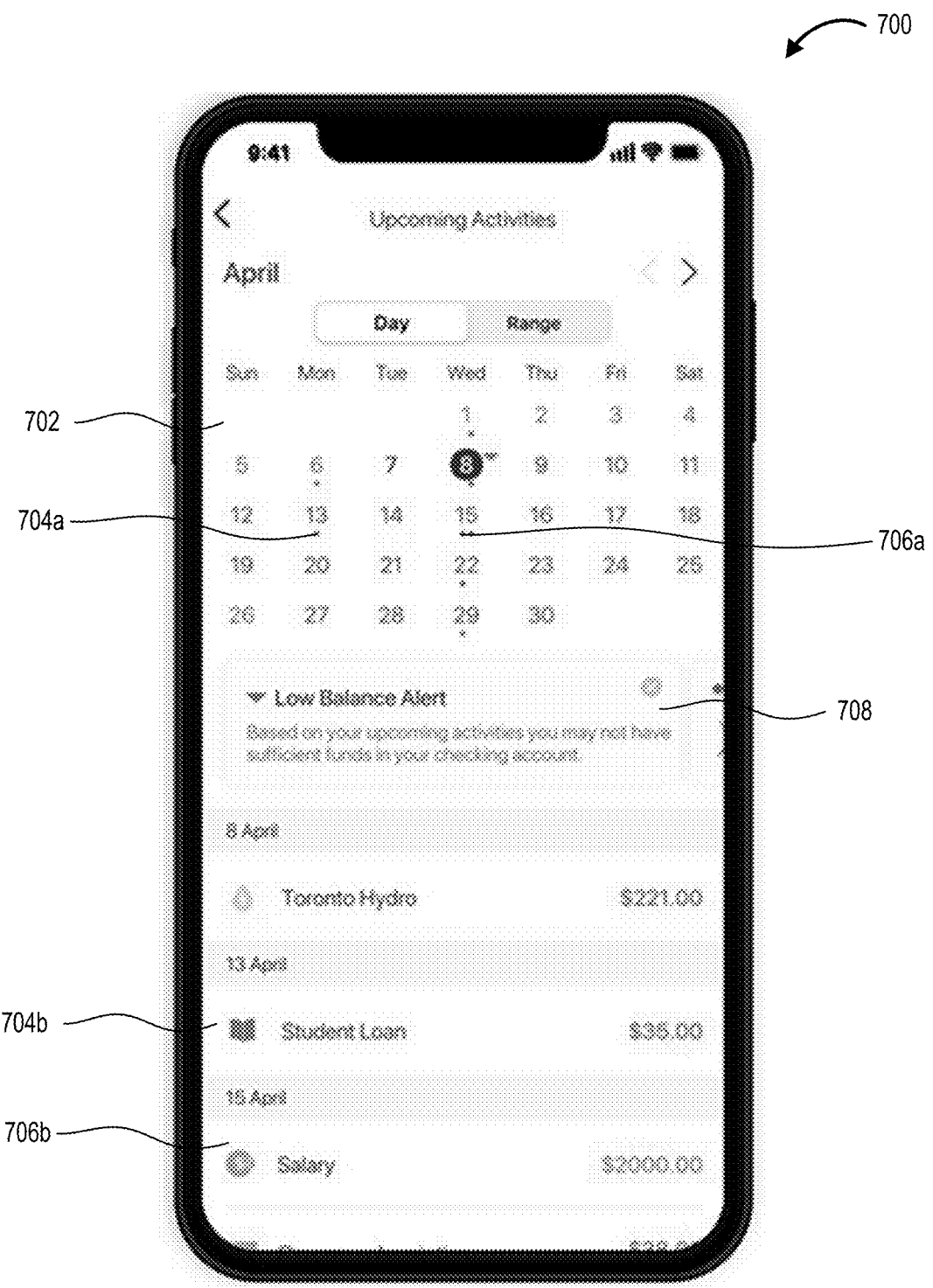
FIG. 7 illustrates a graphical user interface displaying a time-based user interface having scaled resource allocation values overlaid thereon, in accordance with an embodiment of the present application.

Reference is made to FIG. 7, which illustrates a graphical user interface 700 displaying a time-based user interface having scaled resource allocation values overlaid thereon, in accordance with an embodiment of the present application. In FIG. 7, the graphical user interface 700 may include a calendar based interface 702 illustrating days of a month (e.g., April).

The calendar based interface 702 may include one or more user interface elements associated with resource allocations. For example, a first resource allocation interface element 704a may be associated with a Student Loan payment of $35. Further, a text-based interface element 704b may provide details of the resource allocation (e.g., payment to a creditor entity). In another example, a second resource allocation interface element 706a may be associated with a periodic salary payment. Further, a text-based interface element 706b may provide details of the resource allocation (e.g., payment to the user's banking account).

In FIG. 7, the first resource allocation interface element 704a and the second resource allocation interface element 706a may be a coloured dot overlaid on the calendar based interface 702 for providing a graphical representation of features described in the present application.

In some embodiments, the graphical user interface 700 may include one or more notification interface elements 708. In the example illustrated in FIG. 7, in some scenarios, the notification interface elements 708 may alert the user that the overall resource pool value associated with the user may be nearing depletion (e.g., a "Low Balance Alert"). Other notification interface elements indicating other types of alerts associated with a user's resource pool may be contemplated.

Figure 8B:
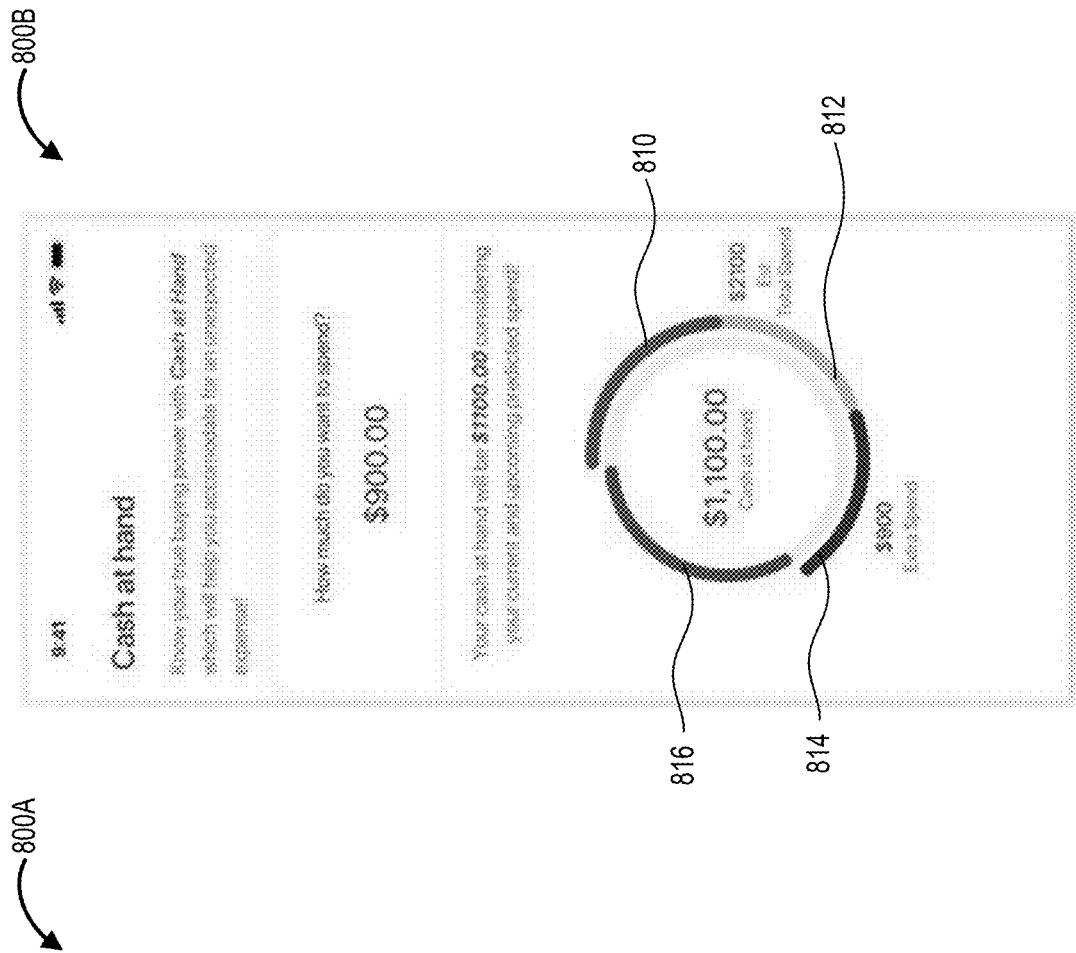
FIGS. 8A and 8B illustrate graphical user interface, in accordance with embodiments of the present application.
Figure 8A:
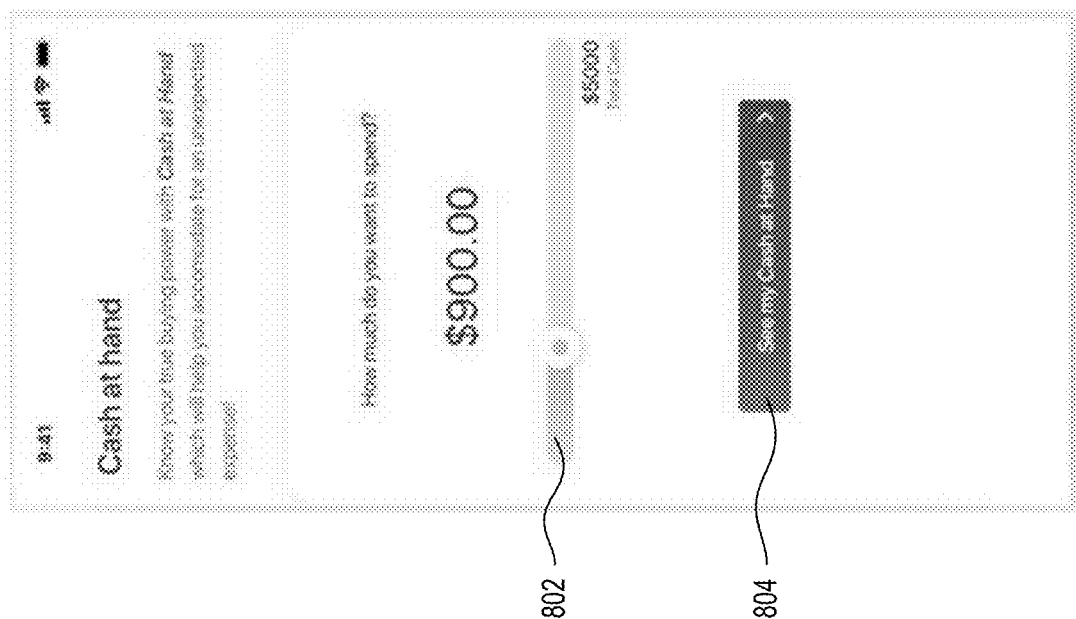

Reference is made to FIGS. 8A and 8B, which illustrate graphical user interfaces, in accordance with embodiments of the present application. FIG. 8A illustrates user interface elements for receiving input associated with an additional resource constraint, in accordance with embodiments of the present application. FIG. 8B illustrates user interface elements for providing a corresponding scaled resource allocation value based on the additional resource constraint, in accordance with embodiments of the present application.

In FIG. 8A, the graphical user interface 800A includes a dynamic slider bar element 802 that may be configured to receive user input. For example, a client device may receive, via a graphical touchscreen interface, from the user an input indicating an additional resource constraint. For instance, the additional resource constraint may be a new monetary transaction that the user may wish to conduct.

The graphical user interface 800A may include a user input element 804 for receiving an input command to trigger generation of a scaled resource allocation value based on the additional resource constraint (e.g., input value received by the dynamic slider bar element 802).

In FIG. 8B, a graphical user interface 800B may display a scaled resource allocation value based on the additional resource constraint that was indicated by the dynamic slider bar element 802 (FIG. 8A). In the present example, the graphical user interface 800B may display a graphical indication 810 of identified recurring resource allocations, a graphical indication 812 of forecasted resource allocations, a graphical indication 814 of the additional resource constraint, and a graphical indication 816 of a dynamically determined scaled resource allocation value based on a forecasted resource pool value. In the present example, the graphical user interface 800B may provide a dynamic user interface for displaying one or more past or forecasted resource pool statistics on a display of a computing device.

In some embodiments of the present application, the system 100 may be configured to obtain a plurality of time-series data sets from one or more source devices or memories. In some scenarios, retrieval of large quantities of data sets may be time consuming and may be limited based on network communication availability. In some situations, a user who may request, via a client device 110 (FIG. 1), a forecasted resource pool value, a scaled resource allocation value, or other example resource pool statistics/metrics described in the present application, may experience a delay in receiving data associated with resource pool statistics/metrics. A user experiencing such delays may infer that the application or system may not be functioning. In another example, the user experiencing such delays in dynamically receiving updated resource pool statistics/metrics may conduct future resource allocations with out-of-date or inaccurate information. Accordingly, embodiments of the system described in the present application may include one or more trigger conditions to pre-emptively conduct operations for determining resource pool statistics to reduce delays in presenting resource pool statistics/metrics on a display for the user.

As an illustrating example, a trigger condition may include an input received on a user interface of a client device 110, and the input may be a touch input for navigating to visual elements associated with at least one time-based metric. Referring again to FIG. 7, the trigger condition may include detection of an input to traverse from one month of a calendar based interface 702 to a prior month or subsequent month. In the present example, the system may be configured to pre-emptively obtain time-series data sets for determining resource pool statistics/metrics associated with prior months or subsequent months. Other trigger conditions for pre-emptively obtaining time-series data and for determining resource pool statistics/metrics may be contemplated.

Figure 9:
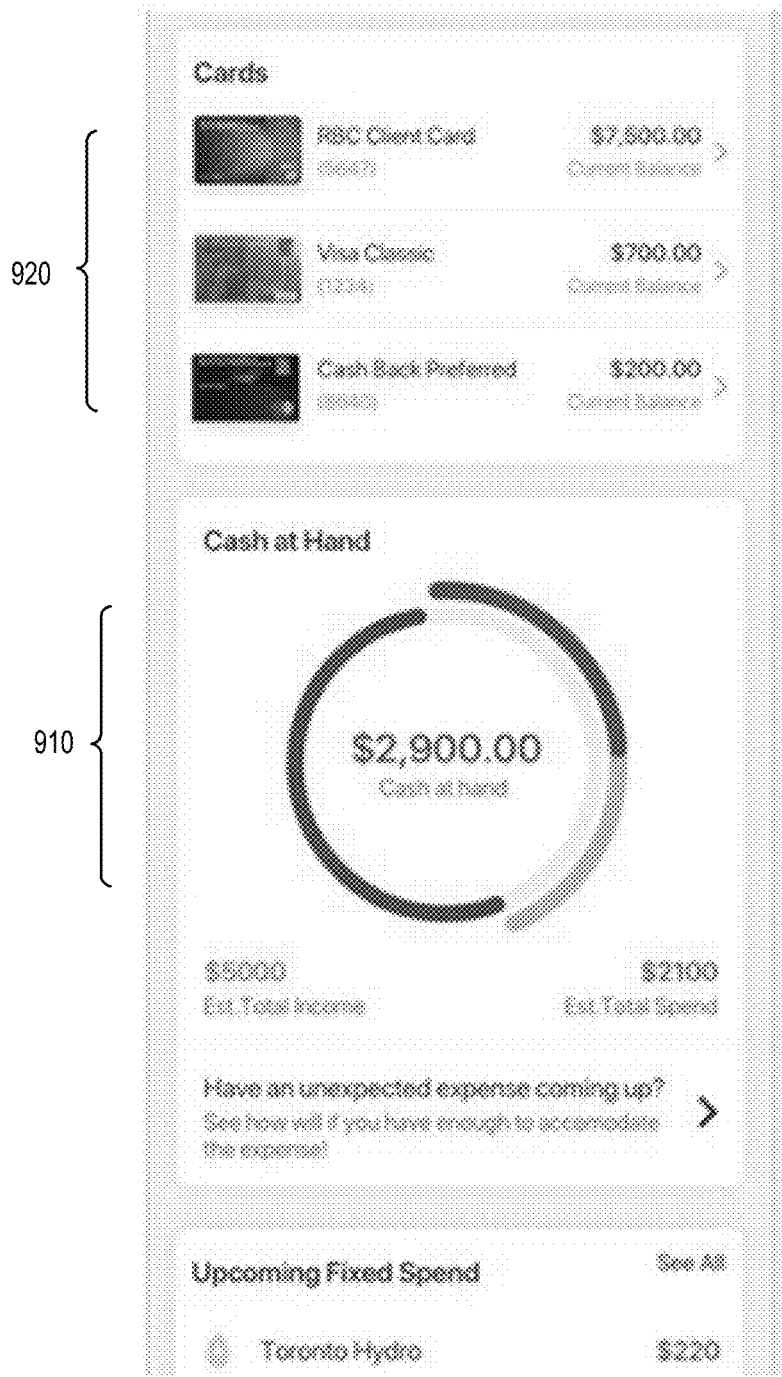
FIG. 9 illustrates a graphical user interface displaying resource pool statistics/metrics, in accordance with an embodiment of the present application.

Reference is made to FIG. 9, which illustrates a graphical user interface 900 configured to display resource pool statistics/metrics, in accordance with another embodiment of the present application. The graphical user interface 900 may include a graphical element associated with resource pool statistics, such as indicators of a scaled resource allocation value based on forecasted resource pool values, identified recurring resource allocations, or other data values.

The graphical user interface 900 in FIG. 9 includes graphical elements 920 for illustrating one or more resource sources that may collectively provide an overall resource pool for a user of the graphical user interface 900. For example, in FIG. 9, the one or more resource sources collectively providing the overall resource pool may include one or more credit card accounts, that may be included in identified prior resource allocations. Data entries associated with the example credit card accounts may be included in previously obtained time series data sets.

Figure 10:
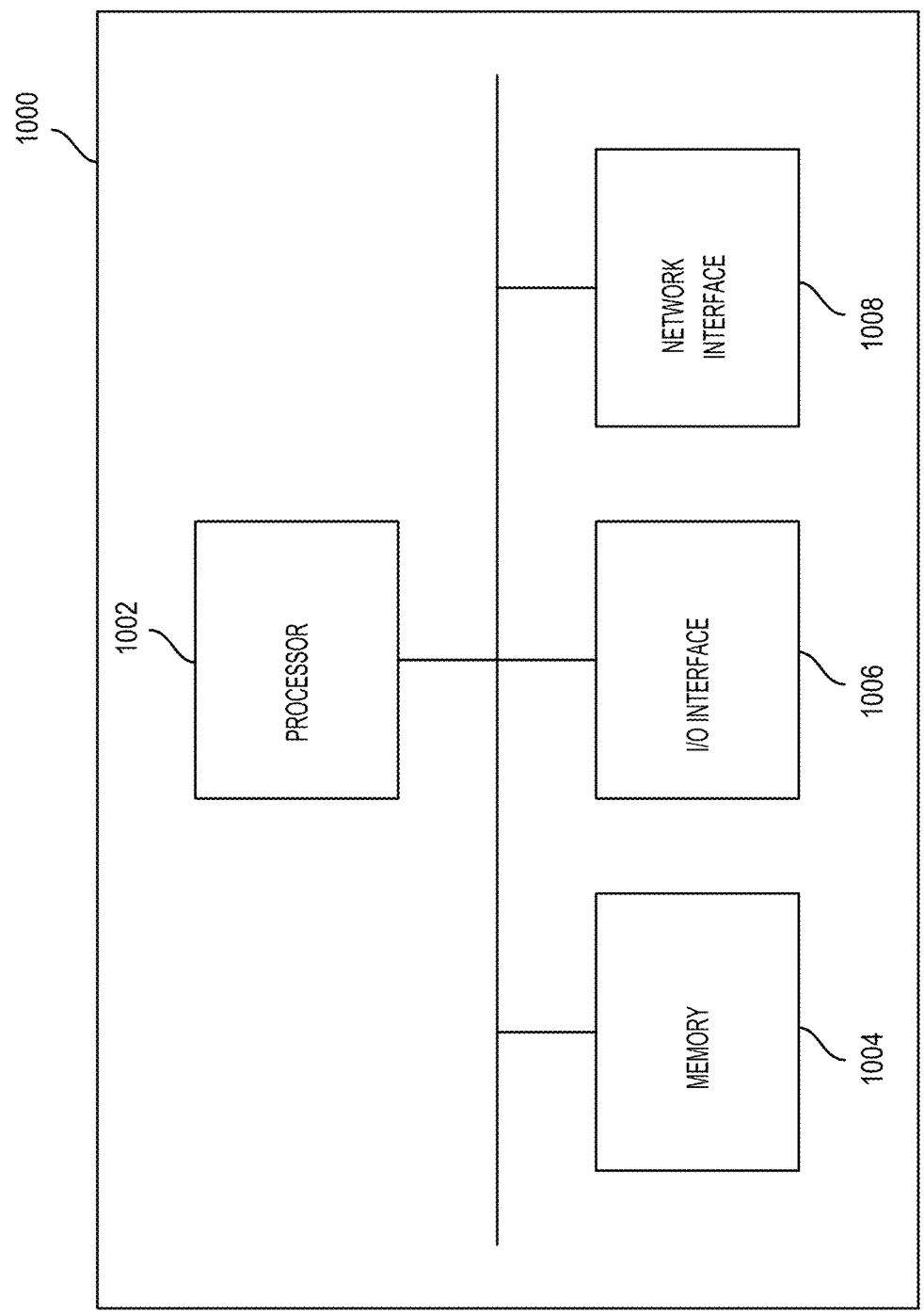
FIG. 10 illustrates a block diagram of a computing device, in accordance with an embodiment of the present application.

Reference is made to FIG. 10, which illustrate a block diagram of a computing device 1000, in accordance with an embodiment of the present application. As an example, the system 100, the client device 110, or the source device 120 of FIG. 1 may be implemented using the example computing device 1000 of FIG. 10.

The computing device 1000 includes at least one processor 1002, memory 1004, at least one I/O interface 1006, and at least one network communication interface 1008.

The processor 1002 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 1004 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 1006 may enable the computing device 900 to interconnect with one or more input devices, such as a keyboard, mouse, camera, touch screen and a microphone, or with one or more output devices such as a display screen and a speaker.

The networking interface 1008 may be configured to receive and transmit data sets representative of the machine learning models, for example, to a target data storage or data structures. The target data storage or data structure may, in some embodiments, reside on a computing device or system such as a mobile device.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis As can be understood, the examples described above and illustrated are intended to be exemplary only.

What is claimed is:

1. A system for facilitating management of a time-varying resource pool, the system comprising:
   a processor;
   a memory coupled to the processor and storing processor-executable instructions that, when executed, configure the processor to:
      obtain a time-series data set including data entries associated with one or more consumed resources;
      identify one or more recurring resource allocations based on recurring data entries of the time-series data set;
      identify, based on output of two or more learning models, additional resource allocations based on irregularly-timed data entries of the time-series data set, wherein the respective output of each of the two or more learning models is generated based on the time-series data set independently;
      determine, based on the respective output associated with the learning model having a lowest error, a forecasted resource pool value based on a weighted combination of the identified recurring resource allocations and the identified additional resource allocations, wherein at least one of the identified recurring resource allocations and at least one of the identified additional resource allocations are each assigned a substantially equal weight in determining the forecasted resource pool value; and
      upon detection of a trigger condition, generate data to display, via a user interface, a scaled resource allocation value based on the forecasted resource pool value, the scaled resource allocation value corresponding to at least one time-based reference.

2. The system of claim 1, wherein detection of the trigger condition is based on input received on a graphical user interface to navigate to visual elements associated with the at least one time-based reference.

3. The system of claim 1, wherein the at least one time-based reference includes one or more successive dates along a time spectrum.

4. The system of claim 1, comprising a user input device, and wherein the memory includes processor-executable instructions that configure the processor to:
   receive, via the user input device, an input associated with an additional resource constraint;
   determine an updated forecasted resource pool value based on the additional resource constraint; and
   display a scaled resource allocation value based on the updated forecasted resource pool value, the scaled resource allocation value corresponding to at least one time-base reference.

5. The system of claim 1, wherein the scaled resource allocation value is a weighted value based on the forecasted resource pool value and the time-based reference.

6. The system of claim 1, wherein identifying the one or more recurring resource allocations based on the time-series data set is based on rules-based pattern recognition.

7. The system of claim 6, wherein the rules-based pattern recognition includes time-based threshold margins for identifying the one or more recurring resource allocations in the time-series data set.

8. The system of claim 1, wherein obtaining the time-series data set is triggered based on detected resource allocations altering the time-varying resource pool value greater than a threshold amount.

9. The system of claim 1, wherein the memory includes processor-executable instructions that configure the processor to:
   determine that the forecasted resource pool value meets an excess threshold value; and
   generate data for display via a user interface to display a notification that the forecasted resource pool value has reached a milestone value.

10. The system of claim 1, wherein the trigger condition is based on an elapsed time duration satisfying a threshold value.

11. A computer-implemented method for facilitating management of a time-varying resource pool, the method comprising:

obtaining a time-series data set including data entries associated with one or more consumed resources;

identifying one or more recurring resource allocations based on recurring data entries of the time-series data set;

identifying, based on output of two or more learning models, additional resource allocations based on irregularly-timed data entries of the time-series data set, wherein the respective output of each of the two or more learning models is generated based on the time-series data set independently;

determining, based on the respective output associated with the learning model having a lowest error, a forecasted resource pool value based on a weighted combination of the identified recurring resource allocations and the additional resource allocations, wherein at least one of the identified recurring resource allocations and at least one of the identified additional resource allocations are each assigned a substantially equal weight in determining the forecasted resource pool value; and upon detection of a trigger condition, generating data to display, via a user interface, a scaled resource allocation value based on the forecasted resource pool value, the scaled resource allocation value corresponding to at least one time-based reference.

12. The method of claim 11, wherein detection of the trigger condition is based on input received on a graphical user interface to navigate to visual elements associated with the at least one time-based reference.

13. The method of claim 11, wherein the at least one time-based reference includes one or more successive dates along a time spectrum.

14. The method of claim 11, comprising:
receiving, via a user input device, an input associated with an additional resource constraint;
determining an updated forecasted resource pool value based on the additional resource constraint; and
displaying a scaled resource allocation value based on the updated forecasted resource pool value, the scaled resource allocation value corresponding to at least one time-base reference.

15. The method of claim 11, wherein the scaled resource allocation value is a weighted value based on the forecasted resource pool value and the time-based reference.

16. The method of claim 11, wherein identifying the one or more recurring resource allocations based on the time-series data set is based on rules-based pattern recognition.

17. The method of claim 16, wherein the rules-based pattern recognition includes time-based threshold margins for identifying the one or more recurring resource allocations in the time-series data set.

18. The method of claim 11, wherein obtaining the time-series data set is triggered based on detected resource allocations altering the time-varying resource pool value greater than a threshold amount.

19. The method of claim 11, comprising:
determine that the forecasted resource pool value meets an excess threshold value; and
generate data for display via a user interface to display a notification that the forecasted resource pool value has reached a milestone value.

20. A non-transitory computer-readable medium or media having stored thereon machine interpretable instructions which, when executed by a processor, cause the processor to perform a computer implemented method of dynamically quantifying data sets associated with a time-varying resource pool value, the method comprising:

obtaining a time-series data set including data entries associated with one or more consumed resources;

identifying one or more recurring resource allocations based on recurring data entries of the time-series data set;

identifying, based on output of two or more learning models, additional resource allocations based on irregularly-timed data entries of the time-series data set, wherein the respective output of each of the two or more learning models is generated based on the time-series data set independently;

determining, based on the respective output associated with the learning model having a lowest error, a forecasted resource pool value based on a weighted combination of the identified recurring resource allocations and the additional resource allocations, wherein at least one of the identified recurring resource allocations and at least one of the identified additional resource allocations are each assigned a substantially equal weight in determining the forecasted resource pool value; and upon detection of a trigger condition, generating data to display, via a user interface, a scaled resource allocation value based on the forecasted resource pool value, the scaled resource allocation value corresponding to at least one time-based reference.

* * * * *